(12) United States Patent
Heppe

(10) Patent No.: US 8,864,063 B2
(45) Date of Patent: *Oct. 21, 2014

(54) TETHERED AIRSHIPS

(75) Inventor: Stephen B. Heppe, Hood River, OR (US)

(73) Assignee: Stratospheric Airships, LLC, Hood River, OR (US)

( * ) Notice: Subject to any disclaimer, the term of this patent is extended or adjusted under 35 U.S.C. 154(b) by 441 days.

This patent is subject to a terminal disclaimer.

(21) Appl. No.: 13/159,215

(22) Filed: Jun. 13, 2011

(65) Prior Publication Data

US 2012/0312918 A1 Dec. 13, 2012

(51) Int. Cl.
*B64B 1/02* (2006.01)
*B64B 1/00* (2006.01)

(52) U.S. Cl.
CPC .................................. *B64B 1/00* (2013.01)
USPC ............................................................ 244/30

(58) Field of Classification Search
CPC ............... B64B 1/00; B64B 1/02; B64B 1/06
USPC ................. 244/1 TD, 30, 127, 900, 901, 902
See application file for complete search history.

(56) References Cited

U.S. PATENT DOCUMENTS

| | | | |
|---|---|---|---|
| 1,549,061 A | 8/1923 | Chenu | |
| 1,372,924 A | 3/1929 | Anderson | |
| 1,818,138 A | 8/1931 | Howland | |
| 2,863,618 A | 12/1958 | Doyle et al. | |
| 4,082,063 A | 4/1978 | Strickland | |
| 4,995,572 A * | 2/1991 | Piasecki | 244/2 |
| 5,857,645 A | 1/1999 | Hodgson | |
| 6,220,543 B1 | 4/2001 | Uskolovsky | |
| 6,422,506 B1 | 7/2002 | Colby | |
| 6,575,403 B1 * | 6/2003 | Monroe | 244/31 |
| 6,824,098 B1 * | 11/2004 | Belloso | 244/25 |
| 6,837,463 B2 * | 1/2005 | Lynn | 244/146 |
| 7,055,777 B2 | 6/2006 | Colting | |
| 7,708,222 B2 | 5/2010 | Lee | |
| 8,006,933 B2 * | 8/2011 | Tillotson | 244/127 |
| 8,061,648 B2 | 11/2011 | Lachenmeier | |

(Continued)

FOREIGN PATENT DOCUMENTS

| | | | | |
|---|---|---|---|---|
| DE | 37 37 233 A1 * | 5/1989 | | B64B 1/00 |
| GB | 2141088 A | 12/1984 | | |
| WO | 2005081680 A2 | 9/2005 | | |

OTHER PUBLICATIONS

Naval Research Advisory Committe, Lighter-Than-Air Systems for Future Naval Missions, Flag Officers and Senior Executive Service, The Pentagon Auditorium, Oct. 4, 2005.

(Continued)

*Primary Examiner* — Rob Swiatek
(74) *Attorney, Agent, or Firm* — Jeffrey K. Riddle; Van Cott, Bagley, Cornwall & McCarthy P.C.

(57) ABSTRACT

In one example, a tethered airship system for high altitude long endurance missions includes a first airship configured to be equilibrially buoyant in a first altitude range and a second airship configured to be equilibrially buoyant in a second altitude range, such that the first airship is at least five kilometers above the second airship. The first airship and second airship are connected by a tether.

30 Claims, 15 Drawing Sheets

(56) References Cited

U.S. PATENT DOCUMENTS

2004/0195431 A1 10/2004 Yumlu et al.
2008/0179453 A1 7/2008 Thompson
2012/0234965 A1 9/2012 Heppe

OTHER PUBLICATIONS

Sanswire Corporation, Unmanned Airship Solutions for Integrated ISR Systems; Technical White Paper, Jul. 24, 2007.
Graham Warwick, Higher ground: Stratospheric airships special report—Aug. 15, 2006—Washington DC-Flight International; Aug. 16, 2006.
Mitre, 12 Miles High; An Integrated Airship-Radar is on the Horizon, Mar. 15, 2010.
Craig L. Nickol et al., High Altitude Long Endurance UAV Analysis of Alternatives and Technology Requirements Development, NASA/TP-2007-214861; Mar. 2007.
George D. Modica et al., An Investigation of Stratospheric Winds in Support of the High Altitude Airship, Atmospheric and Environmental Research, Inc., Lexington, Massachusetts Systems Technology, Inc., Hawthorne, California; Sep. 21, 2010.
JP Aerospace, Something new at the boundary of Earth and space; Tandem Class Airships, http://www.jpaerospace.com/Tandem/tandem.html[Nov. 20, 2010 4:50:26 PM].

* cited by examiner

TETHERED AIRSHIPS

BACKGROUND

Much recent interest has focused on aircraft operation in the lower stratosphere due to the wide field of regard available from this altitude, and also the relatively benign winds in the lower stratosphere compared to higher and lower altitudes. However, even at this altitude, winds are significant and stationkeeping (maintaining position close to a fixed latitude and longitude) can consume a significant amount of power. This power is primarily supplied from some onboard energy source such as batteries or fuel cells. Some airship designs rely on solar cells and rechargeable batteries, but the fundamental need to expend energy for stationkeeping still remains.

Lighter-than-air aircraft ("airships") intended to operate in the stratosphere tend to be large since they require a large "lifting gas volume" per pound of gross vehicle weight, compared to airships operating at lower altitudes. In addition to the mass of the hull which comprises the lifting volume, the gross vehicle weight comprises electronics, energy storage, power generation, propulsion, and payload systems, all of which can be heavy. A large airship experiences significant drag when it attempts to maintain a fixed geographic location against a prevailing wind, and this requires a high power output, large and heavy propulsion systems, and significant reserves of energy. All of these factors tend to increase vehicle weight which leads to increased vehicle size. The weights of these supporting systems tend to scale with the square of each linear dimension of the airship (for similar geometry) since they are proportional to drag which is proportional to surface area. The lifting capacity scales as the cube of each linear dimension (for similar geometry) since lifting capacity is proportional to airship volume. Because of this square-cube relationship, we can be confident that a sufficiently large airship, if it can be built, will be able to carry all its necessary subsystems. As it turns out, airships intended for stratospheric operation tend to be very large.

In many cases of interest, the stationkeeping requirement (and its associated power and energy requirements) is a dominant (or the dominant) factor in overall airship design, gross vehicle weight, and cost. As a consequence, it would be beneficial if power requirements for stationkeeping could be reduced.

An interesting observation is that the wind direction in the lower stratosphere is commonly opposite to that of the wind at higher levels. For example, the wind in the lower stratosphere (around 60,000 to 70,000 feet) might be generally easterly for many months, while the wind at 120,000 to 140,000 feet is generally westerly during the same period of time. Meteorological data over the last 50 years indicate that the wind tends to "switch direction" roughly every 14 months, when winds are generally calm, with the switch in direction generally proceeding from high altitude to lower altitude (i.e., so there are short periods of time when this countervailing wind does not occur, but these periods occur when wind speed is generally low). After a switch in direction, the wind tends to remain moderate for many months, then it tends to experience a period of stronger winds for just a few months, followed by a decline to more moderate wind speeds for many months, and eventually another switch in direction. The behavior then repeats.

For a single airship operating at any altitude, the size and weight of the power generation and propulsion systems tend to be driven by the peak wind condition, since that determines drag and required power for stationkeeping. If a way could be found to minimize power generation and propulsion requirements during nominal and peak wind conditions, airships could be made smaller and would generally involve lower cost.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

As discussed above, the power generation and propulsion requirements of airships for station keeping in atmospheric winds are significant drivers that affect the size and cost of airships. According to one implementation of principles described herein, a lower airship and an upper airship are connected by a long tether, allowing the lower airship to operate in the lower stratosphere and the upper airship to operate at a higher altitude such that the winds affecting the two airships tend to blow in opposite directions. The drag forces on the two airships operate in generally opposite directions, thereby tending to minimize the power used to maintain station close to a desired latitude and longitude.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
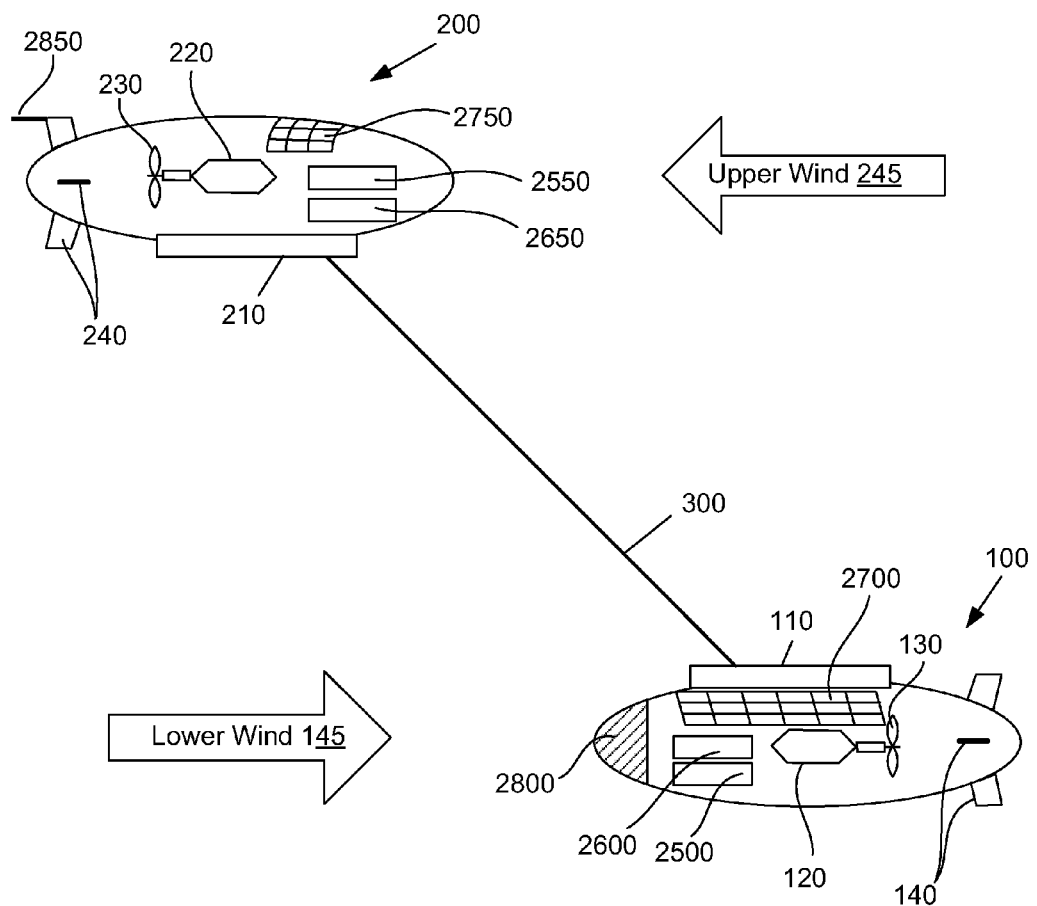
FIG. 1 is a schematic diagram identifying several of the subsystems of a tethered airship, according to one example of principles described herein.

FIG. 1 illustrates a lower airship 100, an upper airship 200, and a tether 300 connecting the airship 100 and the airship 200. The tether 300 is attached to the airships 100, 200 via a tether attachment/deployment subsystem 110 on the lower airship 100, and a tether attachment/deployment subsystem 210 on the upper airship 200. The upper airship 200 is designed to operate at a higher altitude than the lower airship 100, while carrying the full weight of the tether 300.

Both airships are illustrated with propulsion systems (not necessarily the same) identified generically by engines 120 and 220 and propellers 130 and 230. Inherently, these propulsion systems would be associated with a source of power. In some embodiments, only one of the airships is equipped with a propulsion system. Also, both airships are illustrated with horizontal and vertical stabilizers 140, 240. In some embodiments, these could be augmented with aerodynamic control surfaces (elevators and rudders) that would provide a degree of control over the airship's angle of attack, and the heading. In some embodiments, only one of the airships is equipped with horizontal and vertical stabilizers, elevators, and rudders.

The upper airship 200 is sufficiently buoyant to carry its own weight and the weight of the tether 300. In some embodiments, the tether 300 is very long—possibly in excess of 20 km. It is designed to carry its own weight without snapping, as well as sustain the tensile loads placed on the tether 300 by the two airships 100, 200 and the drag forces induced by the winds 145, 245. These tensile loads are discussed further below.

The tether 300 is deployed to an adjustable length by action of one or both of the tether attachment/deployment subsystems 110 and 210, which are shown externally-mounted on the two airships but could also be internally mounted in other embodiments. The tether attachment/deployment subsystems 110 and 210 could be similar in function and capability, or dissimilar. For example, in order to minimize weight of the upper airship, length adjustment elements such as a spool or reel, motor, brake/latching subsystems, and tether spooling/management subsystems (and the like) might be mounted on the lower tether attachment/deployment subsystem 110 only, while the upper tether attachment/deployment subsystem 210 comprises only an attachment subsystem. Alternatively, both tether attachment/deployment subsystems 110 and 210 could comprise a reel, motor, brake/latching subsystem, tether spooling/management subsystem and attachment subsystem.

Figure 2A:
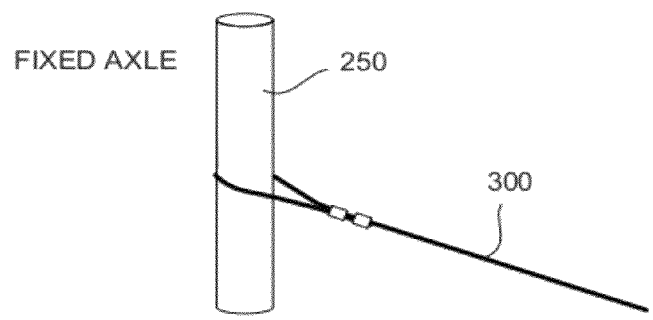
FIGS. 2A and 2B illustrate a fixed axle and a movable axle, respectively, for attaching a tether between two airships, according to one example of principles described herein.
Figure 2B:
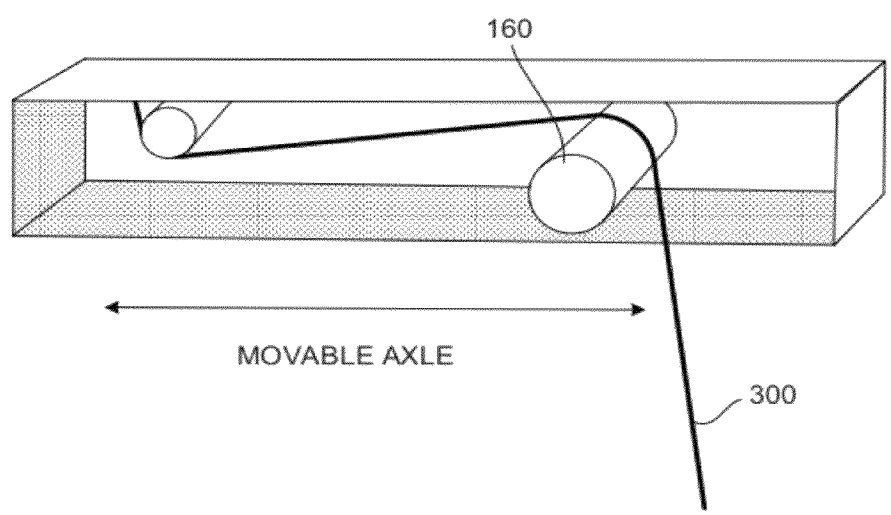

The attachment subsystems 110, 210 may have a variety of configurations. For example, an attachment subsystem may have a fixed axle 250 at which the tensile force of the tether is applied to the attachment/deployment subsystems 110, 210, as shown in FIG. 2A. The tether 300 may be tied or fastened around the fixed axle. Additionally or alternatively, one or more of the attachment/deployment subsystems 110, 120 may include a variable position attachment point where the tensile force of the tether is applied to the attachment/deployment subsystem 110, 210, as shown in FIG. 2B. This could be achieved, for example, by anchoring the tether 300 to a movable mount, or by passing the tether 300 over a roller 160 whose position within the attachment/deployment subsystem can be controllably adjusted. Such a system can be advantageously used to adjust the application of force to the airship, including the torques applied, which affect the dynamic stability of the system and the other forces that need to be applied (e.g., via horizontal control surfaces) in order to achieve a desired angle of attack.

Figure 3:
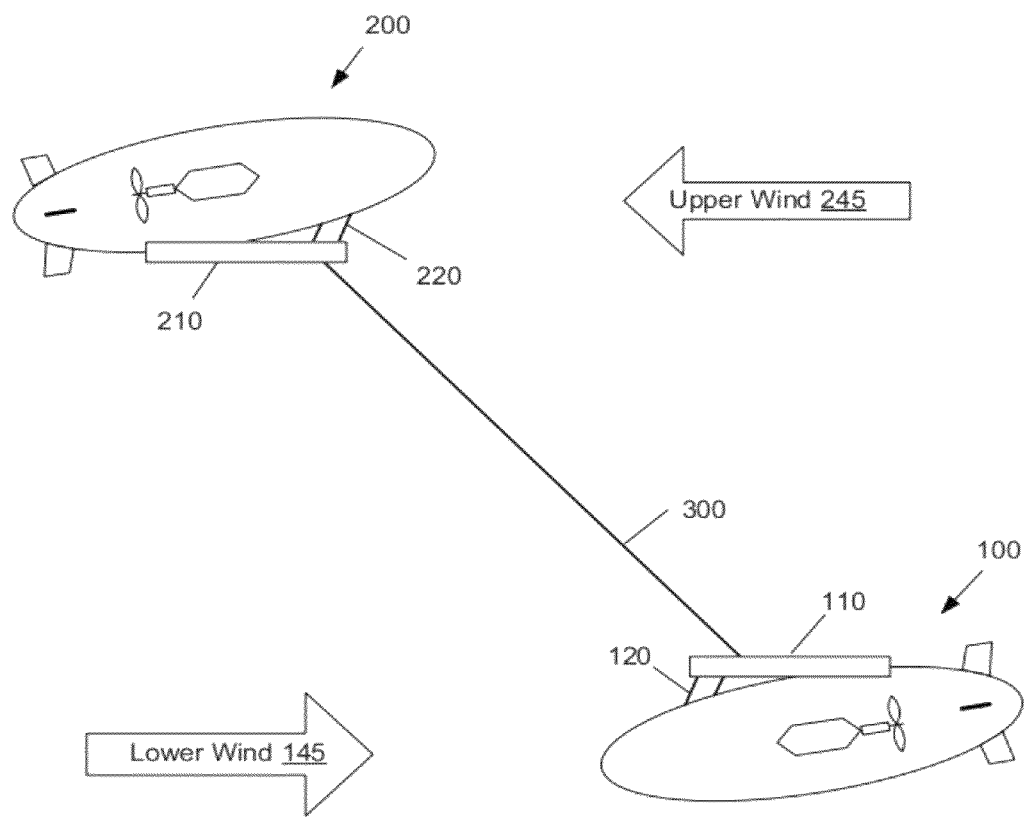
FIG. 3 illustrates in schematic form an upper and lower airship attached by a tether, where the tether attachment/deployment subsystems are attached to the two airships with a variable attachment angle, according to one example of principles described herein.

FIG. 3 shows one illustrative embodiment wherein the attachment/deployment subsystems 110 and 210 have additional functionality to allow an adjustable angular separation, between the airship and attachment/deployment subsystem. This can allow the attitude of the airships and their associated drag characteristics to be controlled. In this implementation, this capability is achieved in part by a single or plurality of adjustable-length shroud lines 120 and 220, and associated shroud management subsystems (not shown), that allow for the angular separation between the airship and the attachment/deployment subsystem to be controllably adjusted.

In one implementation of the invention, the tether 300 is in tension at every point along its deployed length, even in the absence of wind. Thus, the lower airship 100 will float at an altitude above its own equilibrium because it is being pulled upward, and the upper airship 200 will float at an altitude that is below its own equilibrium (even accounting for the weight of the tether) because it is being pulled downward. In the absence of wind and in the absence of propulsive force on both airships, the two airships would tend to float one above the other with the tether in tension between the two.

Returning to FIG. 1, also shown are lower winds W_Lower 145 and upper winds W_Upper 245, generally blowing in opposite directions. In response to the opposing forces associated with these winds, the upper airship 200 and lower airship 100 are laterally displaced with respect to one another and the tether 300 adopts a generalized catenary shape under the influence of airship lateral and vertical forces acting at the tether ends, the weight of the tether itself due to gravity (a force acting downward at each point along the tether), and the varying forces along its length due to wind. However, if the tether had zero thickness and zero weight (only achievable with infinitely strong materials), it would be close to a straight line and its angle from the vertical would depend on the drag forces on the two airships and the difference in buoyancy between the two airships.

Figure 4:
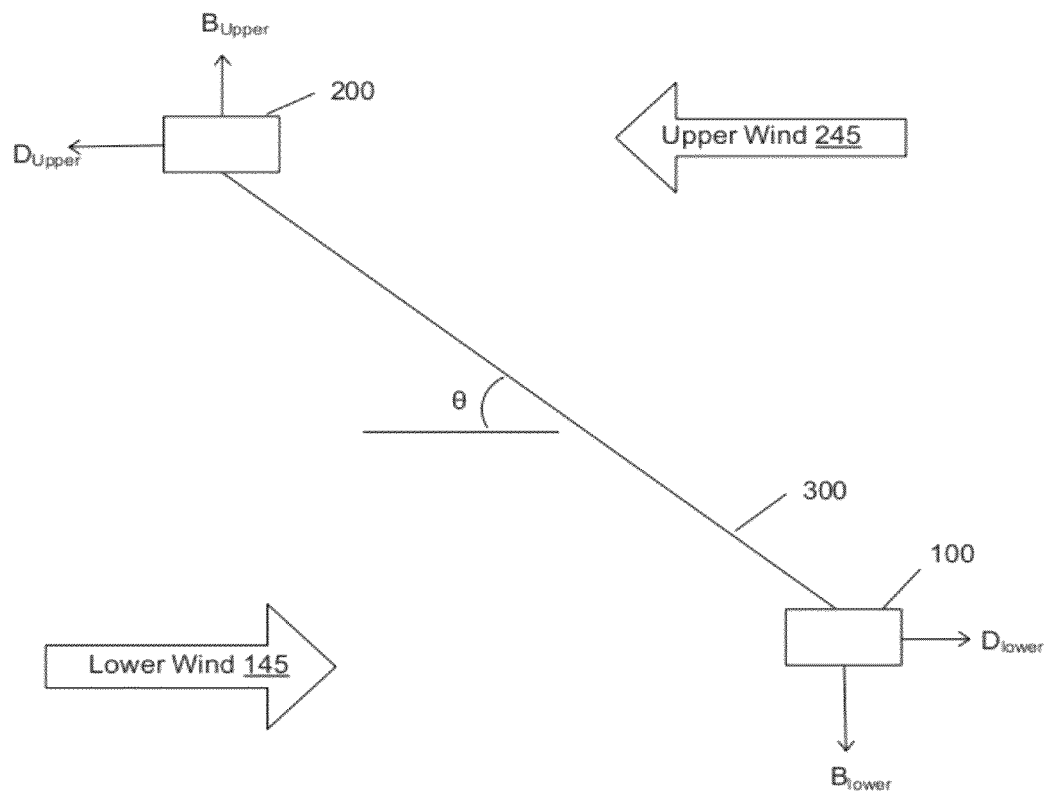
FIG. 4 is a force diagram showing the primary buoyancy and drag forces associated with two airships connected by a tether in countervailing wind conditions, according to one example of principles described herein.

FIG. 4 is a force diagram showing the dominant forces for the system illustrated in FIG. 1. Shown in FIG. 4 are drag forces D_Lower and D_Upper, operating in opposite directions, and buoyancy forces B_Lower and B_Upper, also operating in opposite directions since the lower airship 100 is floating above its equilibrium altitude (it is negatively buoyant) and the upper airship 200 is floating below its equilibrium altitude (it is positively buoyant). At equilibrium (no net forces acting on the system, and no net acceleration, although there may be a nonzero velocity), and ignoring the effects of tether weight and drag, the drag forces experienced by the airships are equal in magnitude and the buoyancy forces experienced by the airships are also equal in magnitude. One objective of the present invention is to allow this equilibrium condition to exist, or approximately exist, at zero ground speed even when winds aloft are strong. Similarly, even when considering a physical tether with weight and thickness (therefore a coefficient of drag that is greater than zero), one objective of the present invention is to allow for overall dynamic equilibrium of the system (no acceleration), or approximate equilibrium, at zero ground speed even when winds aloft are strong. A full accounting of the relevant forces must include the weight of the tether and the variable winds along its length. However, in operation it will be frequently possible to "fly the system" (make adjustments in operating parameters in real time) so as to achieve the desired flight objective based on navigation and meteorological data gathered only at the airships themselves. For example, and as discussed further below, if a net lateral drift is observed using standard navigational gear such as a GPS receiver, drag forces on one or both of the airships could be adjusted to halt the drift and/or return the airships to a more desired location.

For a tether of zero thickness and weight, under equilibrium conditions, the tension on the tether will have a magnitude equal to the square root of the sum of the squares of D_Lower and B_Lower, and it will have an angle with respect to the horizontal that is $\theta=\arctan(\|B_{Lower}\|/\|D_{Lower}\|)$. If $\theta$ is expressed in degrees, the angle with respect to the vertical will be 90-$\theta$.

Figure 5:
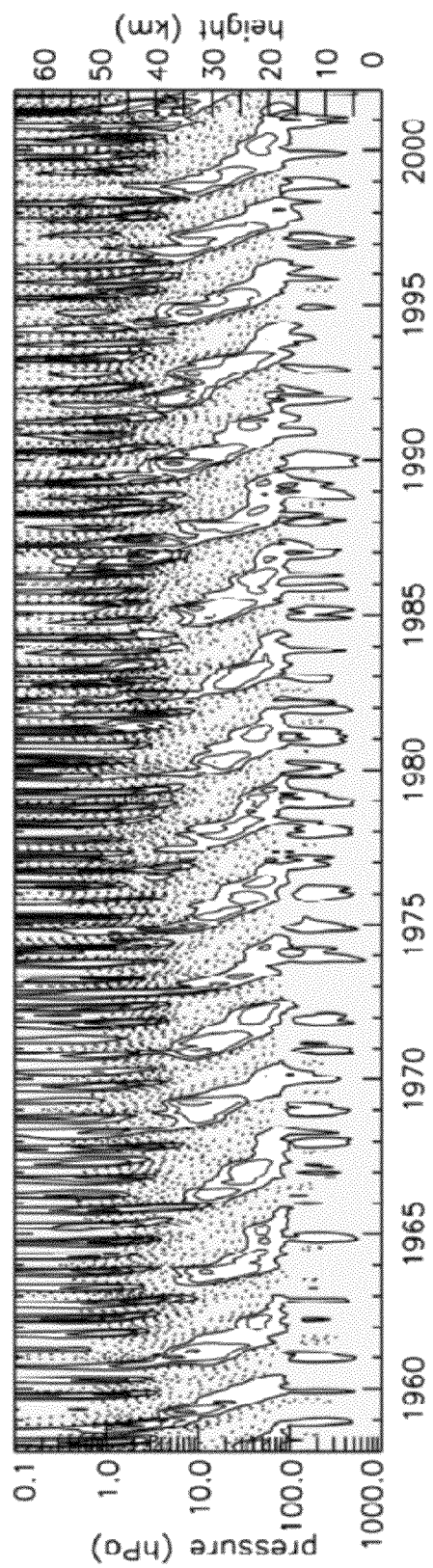
FIG. 5 is a graph of wind data, illustrating wind speed and direction as a function of altitude over a multi-year period.

As discussed above, a relatively large altitude separation $\Delta Alt$ between the two airships 100, 200 can increase the likelihood of the tethered airship system experiencing winds in opposite directions. FIG. 5 is a reproduction of winds-aloft data taken from Pascoe et al. (2005), "The quasi-biennial oscillation: Analysis using ERA-40 data", *J. Geophys. Res.,* 110. Easterly winds are shown as shaded areas and westerly winds are shown as unshaded areas. Contour intervals are shown at intervals of 10 meters per second. As may be seen in the graph, easterlies tend to be stronger than westerlies and periods of strong easterlies in the lower stratosphere (near 20 km altitude) tend to be associated with periods of strong westerlies in the upper stratosphere (near 40 km altitude), and vice versa. Opposing wind directions also manifest, to a degree, between winds near 20 km altitude and winds in the altitude range of 10-15 km.

If two airships connected by a tether were positioned at altitudes experiencing opposing winds, and if these two airships were constructed and/or operated to achieve roughly equal but opposite drag forces at zero ground speed, net propulsive forces for stationkeeping would be minimized. Furthermore, since each airship would experience high airspeed when winds are strong, airfoils and other large aerodynamic surfaces could be used to generate dynamic lift (either positive for the upper airship or negative for the lower airship) to increase the angle of the tether to the horizontal, or possibly "fly" the tandem combination to mutually higher or lower altitudes.

In order to achieve large altitude separation with minimum tether length, the buoyancy forces tending to separate the airships vertically should be large compared to drag forces tending to separate the airships horizontally. This condition can be achieved in the absence of wind by simply ensuring positive buoyancy on the part of the upper airship, at its maximum altitude and considering the full weight of the tether, since in this case drag is zero and any positive value of buoyancy for the upper airship (considering the weight of the tether) guarantees that the airships are flying one above the other with the tether in tension between the two. When winds are non-zero (presumably operating in opposite directions on the two airships), buoyancy forces can include contributions from dynamic positive lift on the part of the upper airship and dynamic negative lift on the part of the lower airship. Under equilibrium conditions and with altitude separation $\Delta Alt$, the length of a zero-thickness and zero-weight tether would be TetherLength=$\Delta Alt/\sin(\theta)$. For practical tethers which have thickness and weight, the tether will follow a generalized catenary shape under the varying influences of drag and weight along its length, and so will be a curve instead of a line segment. The total length of tether for a given altitude separation $\Delta Alt$ will therefore be greater than $\Delta Alt/\sin(\theta)$.

As discussed in greater detail below, a tethered airship system for high altitude long endurance missions may include a first airship, a second airship and a tether. The first airship is configured to be equilibrially buoyant in a first altitude range while carrying the tether. The second airship is configured to be equilibrially buoyant in a second altitude range with the first altitude range being higher than the second altitude range. The tether connects the first airship to the second airship such that the first airship is at least one kilometer above the second airship. The tethered airship system may have a variety of configurations and illustrative examples are given below.

Aerodynamic Control

A variety of aerodynamic surfaces and techniques can be used in conjunction with the tethered airship system for stationkeeping. These controllable aerodynamic surfaces can be used to compensate for different wind conditions and minimize the overall need for propulsion. For example, strong westerly winds may be experienced by the upper airship while the lower airship experiences more benign easterly winds resulting in lower drag at zero ground speed. To keep the tethered airships from drifting away from their desired station, the lower airship could deploy aerodynamic elements that increase its drag. Additionally, aerodynamic surfaces could be used to alter the altitude of the airships and/or tension in the tether.

Figure 6A:
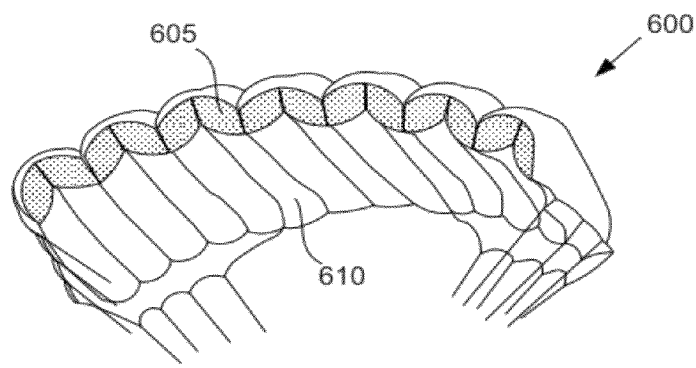
FIG. 6A-6C illustrate a variety of parafoils which may be used in conjunction with an airship.
Figure 6B:
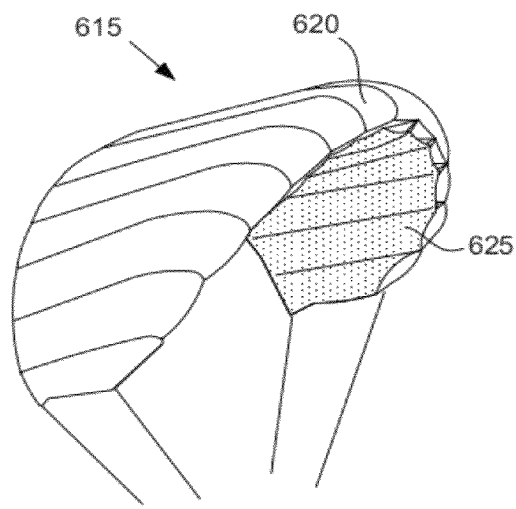
Figure 6C:
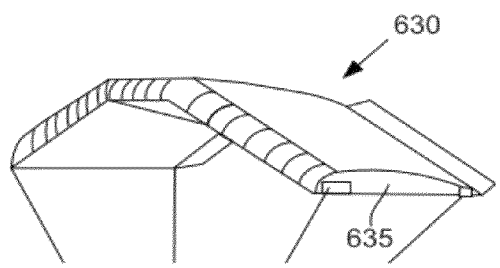

FIGS. 6A-6C are illustrative examples of parafoils which can be controllably deployed from an airship to alter its lift and drag characteristics. These parafoils can rely on inflation solely from the ambient wind, or contain air-tight "bladders" providing a degree of structure even in the absence of wind. FIG. 6A is a diagram of a ram filled parafoil 600. Openings 605 in the front of the parafoil 600 gather air that is trapped inside cavities 610 in the parafoil. This trapped air inflates the cavities 610 and provides rigidity and aerodynamic shape to the parafoil 600. See also U.S. Pat. No. 3,285,546 (Multi-Cell Wing Type Aerial Device) awarded to D. C. Jalbert.

FIG. 6B is an illustrative parafoil 615 that combines sealed inflated bladders 620 with air ram techniques. The sealed inflated bladders 620 provide a basic shape to the parafoil even at zero wind speed. This allows the air ram openings 625 to remain open and ready to accept air when the wind conditions are right. The sealed inflated bladders 620 may contain a variety of gases including lighter than air gas, heavier than air gas, dry nitrogen, or atmospheric air.

FIG. 6C is another parafoil 630 which has a more rigid construction and maintains an efficient lifting geometry. As can be seen in the figure, the parafoil has a cross section 635 that resembles an airplane wing and can produce significant lift as winds pass over it.

Figure 7:
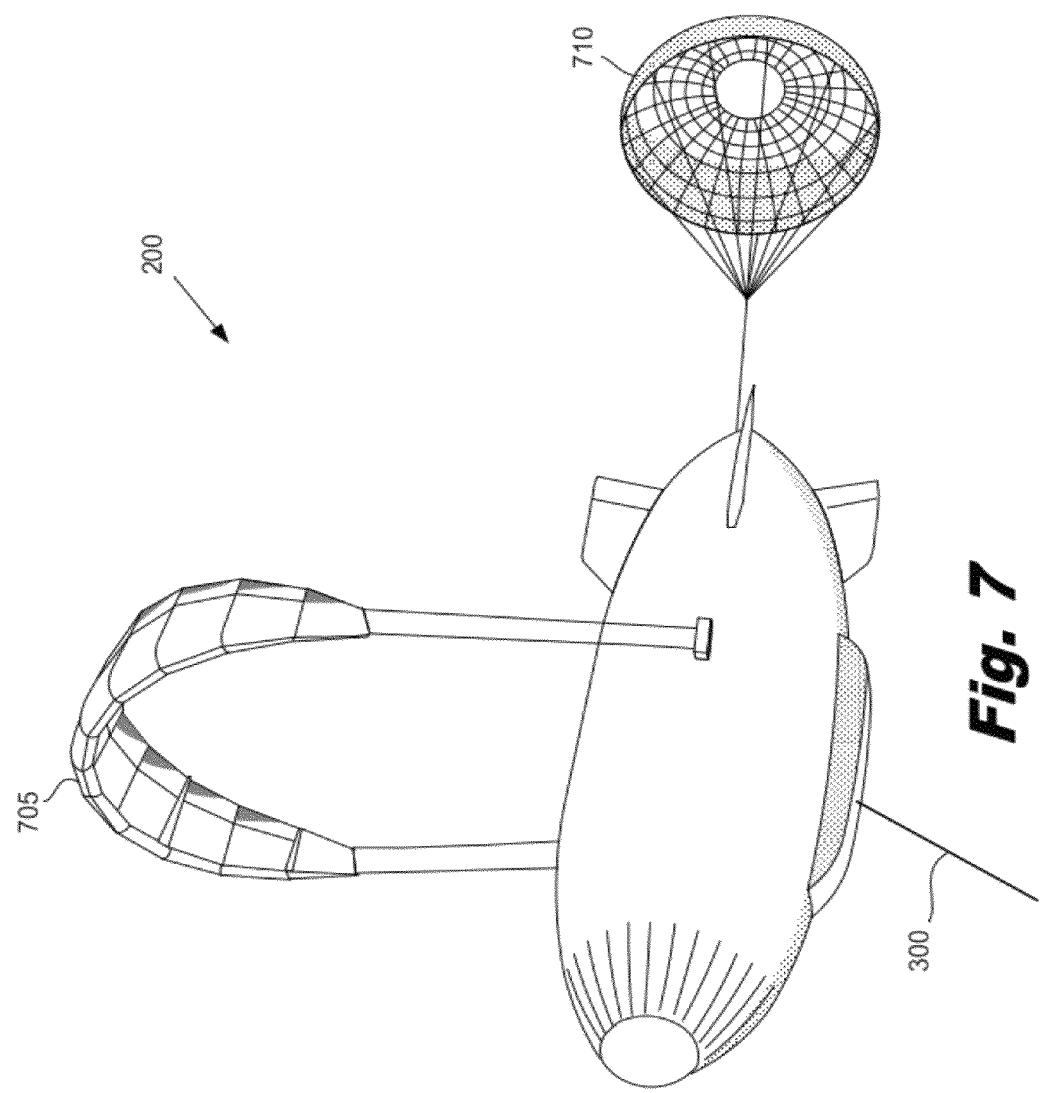
FIG. 7 is perspective view of an airship equipped with a parafoil and a parachute, according to one example of principles described herein.

FIG. 7 is a perspective view of an upper airship 200 which has deployed both a parafoil 705 and a parachute 710 to more effectively utilize the differences in wind speeds for station keeping. For example, the parachute 710 may be used to increase the drag of the upper airship 200 to compensate for stronger winds experienced by the lower airship. The parafoil 705 may be used to produce lift to increase tension in the tether 300 and/or lift the upper airship 200 to a higher altitude. Each of the aerodynamic elements 705, 710 can be controlled to produce the desired dynamic lift and/or drag within the constraints of the system. While this illustration shows the upper airship as a dirigible shape with horizontal and vertical stabilizers and control surfaces, other designs are possible as discussed below. Dirigible shapes are frequently considered for operation in the troposphere and lower stratosphere, and could be used for both the upper and lower airship of a tethered pair designed to operate in the altitude range of 10-20 km altitude. However, at higher operational altitudes, such as 30-40 km, other designs, such as those illustrated in FIGS. 8 and 9, will tend to be preferred.

In one embodiment contemplated herein, the parafoil 705 contains bladders inflated with hydrogen to ensure that it flies at a higher altitude than the upper airship 200 itself, even when there is no wind, and to also ensure that the parafoil inflates correctly in high wind conditions. In another embodiment, the parafoil 705 contains bladders inflated with hydrogen or another gas to ensure proper inflation in low wind, but has insufficient buoyancy to lift itself off the upper airship 200 in the absence of an ambient wind. The parafoil angle of attack and heading can be controlled via shrouds and control lines connecting the parafoil to the upper airship via suitable control line actuators to control line length and tension, allowing for controllable variation in lift and drag as well as allowing for some cross-wind propulsion. Furthermore, in some embodiments, the control lines can be reversibly "reeled in" to stow the parafoil against the surface of the airship and thereby minimize both lift and drag.

The lower airship can also be equipped with a parafoil. If it is desired to equip the lower airship with a parafoil designed for negative dynamic lift, the parafoil would fly below the lower airship but would still be controlled via shrouds and control lines connecting the parafoil to the lower airship via suitable control line actuators to control line length and tension. In one embodiment herein, a parafoil intended to provide negative dynamic lift contains bladders filled with carbon dioxide or an alternative heavier-than-air gas to ensure that it flies at a lower altitude than the lower airship itself, and that it inflates correctly in high wind conditions.

A parafoil provides both dynamic lift (positive or negative) and also increased drag. If increased drag is required, with or without a parafoil, a parachute or equivalent drag enhancement device can be used. For a particular wind speed (airspeed) and at full deployment, a given parachute will have a characteristic maximum drag. However, various methods known in the art can be used to reduce the drag provided by a given parachute in a given wind condition, thereby modulating the drag to match requirements. For example, the size of the aperture can be reduced by constricting a control line running around the circumference of the aperture. Additional control lines can be spaced at parallel planes throughout the parachute to control the amount of fluttering material in the non-fully-inflated parachute. Alternatively, selected panels of the parachute can be opened to allow free (or more free) passage of air.

If drag forces experienced by the upper and lower airship are equal in magnitude but opposite in direction, at (or near) zero ground speed, stationkeeping propulsion requirements will be minimized. For airships of similar geometry, material composition, and heading with respect to the wind, drag forces are proportional to air density and airship surface area, and are also proportional to the square of airspeed. The drag force may be calculated as $$F_d = \frac{1}{2}\rho v^2 A C_d$$

where $\rho$ is air density, v is airspeed, A is the reference area and $C_d$ is the coefficient of drag. Air density varies by roughly an order of magnitude between the lower stratosphere (near 20 km altitude) and the upper stratosphere (near 40 km altitude), being lower at higher altitudes, and wind speed can vary as well. Wind speed tends to be lower in the lower stratosphere than the upper stratosphere. The tendency of wind speeds in the upper stratosphere to be higher than wind speeds in the lower stratosphere compensates to some degree for the reduced air density at higher altitudes; however, wind speed experienced by each airship, and the resulting drag forces, can vary from hour to hour. As a consequence, a variety of techniques may be used to equalize (or approximately equalize) drag forces between a lower airship and an upper airship. It should be noted that perfect equalization is not required since even partial equalization will reduce stationkeeping propulsion requirements; however, full equalization is a desired goal.

The following methods, among others, can be employed to adjust drag forces on the upper and lower airships:

- Minor adjustments in drag can be achieved through the use of airbrakes and turning maneuvers (e.g., oscillating back and forth across the oncoming wind) on the part of the airship experiencing lower drag;
- The airship experiencing lower drag force can deploy a parachute if it has not already done so, or increase the drag coefficient of a deployed parachute if it is not already maximized;
- The airship experiencing higher drag force can reduce the drag coefficient of a deployed parachute, or stow the parachute completely;
- The angle of attack of deployed parafoils can be adjusted to vary the amount of lift and drag. Also, if so equipped, the airfoil can be enlarged or reduced in size by alternately inflating or deflating selected lifting cells;
- The angle of attack of the airships themselves can be adjusted by use of horizontal control surfaces, or by changing the angle of the tether attachment/deployment subsystem relative to the airship as shown in FIG. 3;
- The length of the tether can be adjusted, in concert with other controllable factors affecting lift and drag, so as to fly the airships at altitudes where the drag forces can be equalized. Adjustments in positive and negative dynamic lift can be used to fly the two airships to higher or lower altitudes, and the length of tether can be used to adjust their altitude separation.

The Tether

The tether that connects the upper and lower airships is a significant element in the system. Ideally, the tether would be lightweight yet strong enough to avoid failure under the force exerted by its own weight as well as the drag and buoyancy forces (positive and negative) tending to separate the airships. A "simple tether" may be characterized as having uniform cross-section along its length and being homogeneous in material. However, a variety of other approaches could be used that include more complex tethers with non-uniform cross-section and inhomogeneous materials. For purposes of explanation, the system will be described with respect to an embodiment employing a tether with uniform cross-section and homogeneous material.

The strength of a tether material may be described by the tensile load it can sustain per unit of cross-sectional area. This metric may be variously expressed as pounds per square inch (psi), Pascals (Pa), Newtons per square meter (N/m$^2$), or atmospheres (as well as other units). Spun Kevlar, for example, has a tensile strength of 3620 million Pascals (MPa) which is roughly equivalent to 525,000 psi. Spectra 2000, a commercially-available fiber from Honeywell, has a tensile strength of 3500 MPa. Quartz fibers can achieve 20,000 MPa which is roughly equivalent to 2.9×10$^6$ psi. Currently-available carbon fiber reinforced polymers (CFRP) have tensile strengths as high as 400 GPa; however, the inventor is not aware of long tethers constructed of this material, to date. Both spun Kevlar, and quartz fibers, can be used to construct tethers of great length. In the future, other materials such as Spectra 2000, CFRP or carbon nanotubes might be constructed into long high-strength tethers. The inventive concept incorporates these and other materials, keeping in mind that the objective is high strength and light weight. It is also recognized that a tether for an operational system such as described herein might have other (possibly non-load-bearing) components such as sheathing for environmental protection, and possibly electrical conductors or optical fibers adapted for communications and/or power transfer between the upper and lower airship. These components would add weight, but are not further addressed herein. It is also noted that some materials, such as carbon nanotubes developed in the future, might provide high strength along with electrical and/or optical conductivity.

As a strawman, consider a tether able to sustain a load of 50 kN.[1] If constructed of spun Kevlar or Spectra 2000 with a tensile strength of approximately 3500 MPa, such a tether would have a cross-sectional area of 0.15 cm$^2$ (diameter ~0.4 cm). If constructed of drawn quartz with a tensile strength of 20 GPa, such a tether would have a cross-sectional area of 0.025 cm$^2$ (diameter ~0.2 cm)

[1] As a point of reference, the NASA Concept 12 airship described in Nickol, et. al., 2007 (NASA/TP-2007-214861), sustained peak drag forces in the lower stratosphere of 13 kN. This was a relatively large airship. If this airship were used as a strawman for the lower airship in the inventive concept, the upper airship would also have to experience a drag force of 13 kN, during peak winds, in order to allow the combined system to remain relatively stationary. Buoyancy forces would have to be larger than this value in order to keep the tether angle "theta" greater than 45 degrees (hence avoiding excessive tether length). With buoyancy forces equal to or slightly larger than the drag forces, total tension on the tether would be on the order of 20 kN. Thus, a 50 kN tether would offer a safety factor of 2.5:1. The drag forces, buoyancy forces, and safety factor used here are for illustration only.

The total weight of a tether can be calculated from knowledge of its density and its total volume which is equal to its cross-sectional area times its length. Spectra 2000 has a density of about 1 gram/cubic centimeter (1 g/cc); Kevlar has a density of approximately 1.44 g/cc and quartz has a density of approximately 2.65 g/cc. A 30 km tether able to sustain a load of 50 kN, constructed of Spectra 2000, would have a weight of roughly 460 kg. A 30 km tether able to sustain a load of 50 kN, constructed of spun Kevlar, would have a weight of roughly 600 kg. A 30 km tether able to sustain a load of 50 kN, constructed of drawn quartz, would have a weight of roughly 200 kg. Future materials might offer equivalent or higher load bearing capability with lower weight. For example, researchers interested in developing a space elevator have set a goal of roughly 30 MegaYuri (30 MYuri) as a desirable threshold for a tether material, where the metric "MYuri" refers to the tensile strength in GPa divided by the density in grams per cubic centimeter. In terms of this metric, Spectra 2000 demonstrates about 3 MYuri (i.e., specified values for the raw material are in the range of 3.5 MYuri, and a 2 m test length has already demonstrated a performance of 2.8 MYuri). Space elevator researchers have noted rapid progress in tether materials with specific focus on carbon nanotubes. However, even the currently-available materials can be used to construct useful tethers that can be held aloft by a suitably-constructed upper airship. Considering that the force exerted by a kilogram mass is 9.8 Newtons, even the spun Kevlar tether represents a load of only 6000 N which may be accommodated within the 50 kN strawman tether design (although design margin is reduced). Of course, it is also possible to adjust the design of the tether slightly to increase its cross-sectional area and overall strength.

Balloon Design

Figure 8A:
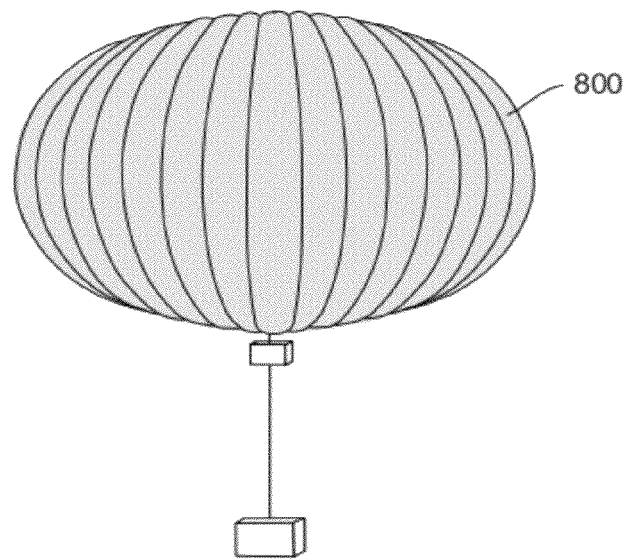
FIGS. 8A-8D illustrate various high altitude airship configurations which incorporate a pumpkin-lobed balloon design, according to one example of principles described herein.
Figure 8B:
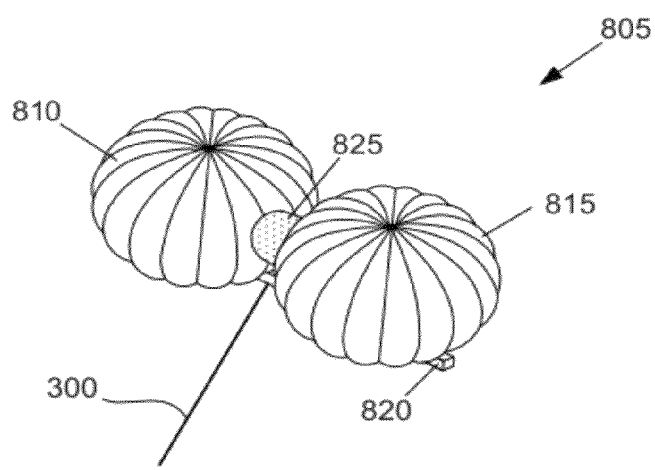

A wide variety of designs could be used for the airship that operates in the lower stratosphere. The upper airship is more problematic since the upper stratosphere has lower density, yet the upper airship must carry the weight of the tether (potentially 600 kg or more using currently-available materials). The Japanese space agency, JAXA, has supported high-altitude balloon experiments for several years, and has recently (2003) flown a super-pressure high-altitude balloon to an altitude of 53 km. The balloon featured a thin-film "pumpkin-lobed" design with a lifting volume in excess of 60,000 m$^3$. A generic "pumpkin-lobed" high altitude balloon 800 is illustrated in FIG. 8A. JAXA has also proposed a very large balloon of 500,000 m$^3$ that could carry its own weight plus 1700 kg to a height of 38 km. While JAXA has not, to the inventor's knowledge, conceived of a tethered system such as described herein (e.g., with a tether, parafoil, parachute, dual-airship concept, and drag cancellation technique), this generic high-altitude lift capability would be adequate for certain embodiments of the upper airship as described below. Another possible design, able to carry aloft a 600 kg tether along with other required hardware, is illustrated in FIG. 8B. This figure shows a double balloon 805 in a dumbbell configuration, based on a 300,000 m$^3$ JAXA balloon concept. The double balloon 805 includes a first lobe 810 and second lobe 815 that are connected by a tube 825. In this illustrated embodiment, each lobe of the dumbbell-shaped balloon is envisioned to have a volume on the order of 300,000 m$^3$ in order to support a useful lifting capacity (i.e., beyond the weight of the balloons themselves) on the order of 900 kg. The tube 825 may perform a number of functions, including mechanical support and/or gas transport between the first and second balloon in order to e.g. support changes in angle of attack. A double balloon with a controllable seal between the two would also provide a measure of additional safety since a puncture of one balloon or the other would not result in total loss of buoyancy (although the resulting system would certainly descend to a lower altitude). An equipment gondola 820 is suspended below the double balloon 805. The equipment gondola (not drawn to scale) supports housekeeping functions and a tether attachment system with either a fixed or movable attachment point for a tether 300. One possible alternative to the dumbbell shaped balloon of FIG. 8B would be two separate balloons each attached to the equipment gondola.

Figure 8C:
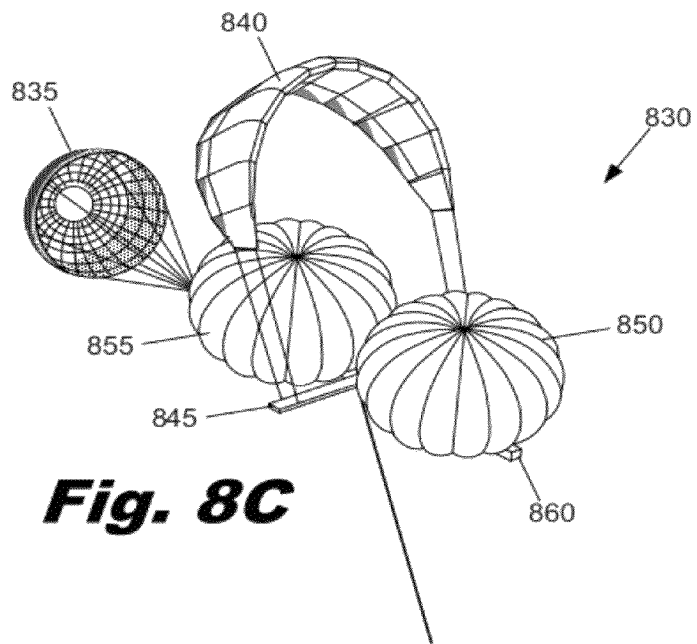

FIG. 8C is a not-to-scale perspective view of a double balloon system 830 that includes two lobes 850, 855, an equipment gondola 860, a parachute 835, and parafoil 840. The equipment gondola 860 is suspended from the two lobes 850, 855. The illustrated concept also shows a parachute 835 attached to the equipment gondola 860 and parafoil 840 attached to a transverse beam 845 which has a direct mechanical attachment to the equipment gondola 860. Parachute and parafoil control hardware is not shown but is assumed to be present in the equipment gondola and transverse boom, respectively.

Figure 8D:
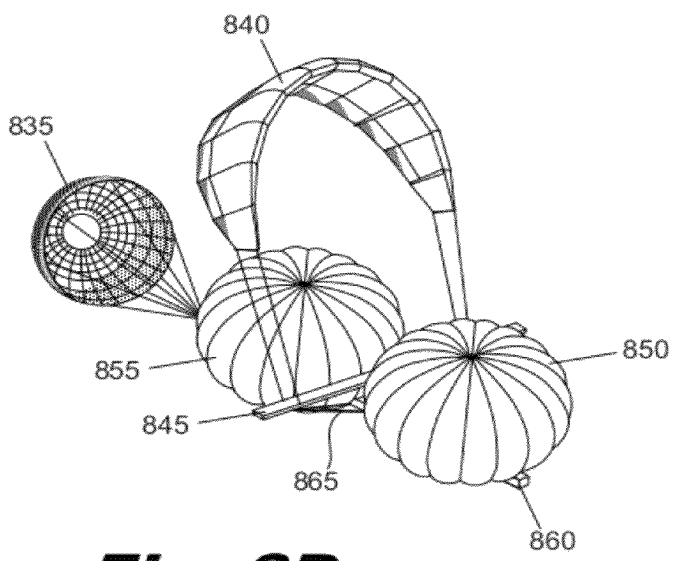

A variety of other arrangements based on this concept could also be used. For example, the transverse beam 845 may be attached to the equipment gondola 860 via suitable lines or cables 865—possibly constructed of the same material as the tether as shown in FIG. 8D. In this example, the parafoil 840 contains a buoyant gas such as hydrogen so that it floats above the balloon lobes 850, 855 and partially or completely supports the transverse beam 845 in zero-wind conditions. In an ambient wind, the parafoil 840 fills with air and provides dynamic lift. The lift and drag characteristics are controllable via action of control lines. The parachute 835 provides adjustable drag, and in combination with the tether, ensures proper orientation of the system in the wind.

Figure 9:
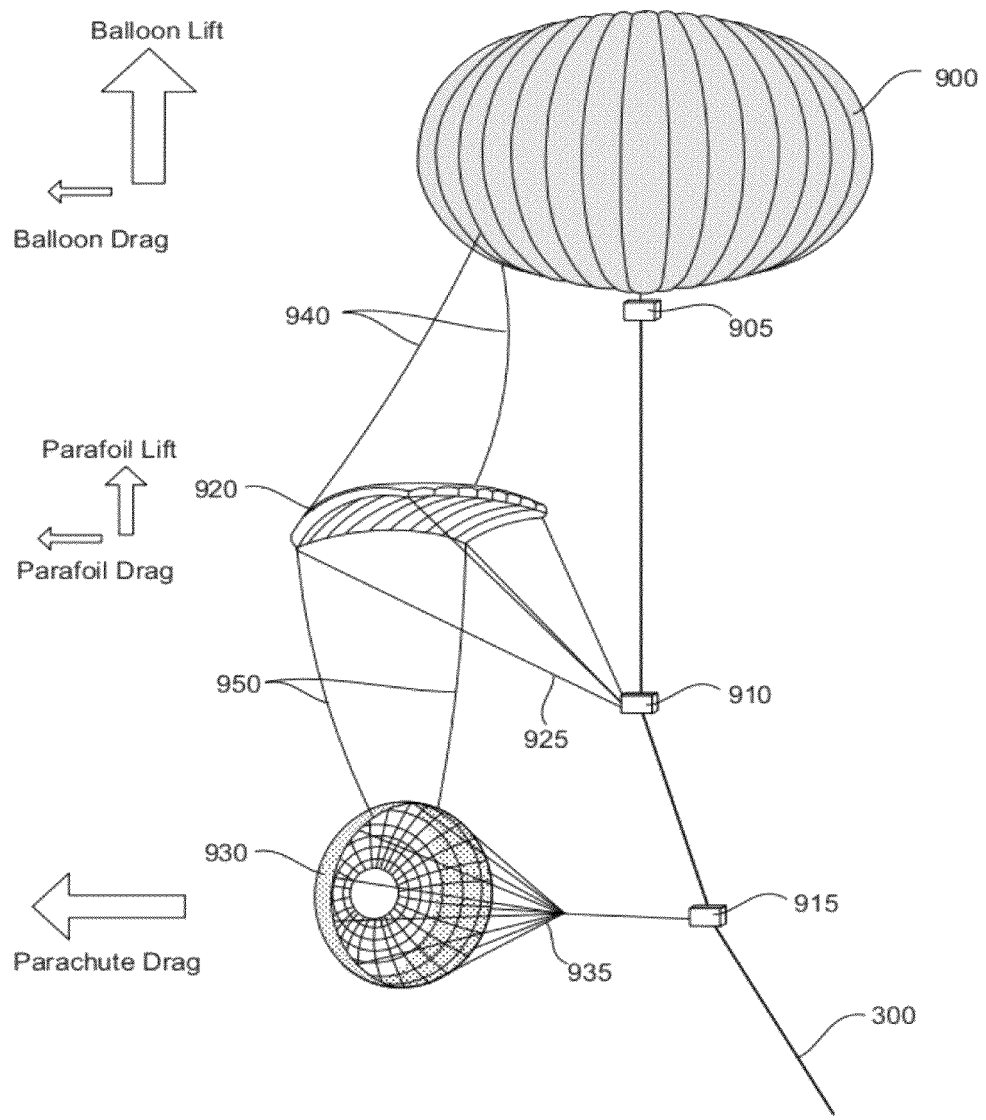
FIG. 9 illustrates a high altitude balloon with controllable aerodynamic elements, according to one example of principles described herein.

Another possible alternative is to use a single larger balloon as illustrated in FIG. 9. Here, the upper airship 900 is a pumpkin-lobed balloon with a tether attachment subsystem 905 which also serves as an equipment and electronics gondola. Solar cells, batteries, power management and distribution equipment, radios, navigation receivers, computers, and the like, are collectively not shown but are present and provide for the power needs of the upper airship and the command and control of its associated systems. In addition to the primary tether attachment subsystem 905, there are two additional equipment packages 910 and 915 illustrated as being spaced apart from one another along the tether 300. Equipment package 910 serves as the anchor for the parafoil 920 and also comprises the control electronics and actuators for the parafoil shroud/control lines 925. The parafoil 920 can thereby be controlled with respect to its angle of attack, L/D ratio, and orientation to allow for lateral lift forces. Equipment package 915 serves as the anchor for the parachute 930. Shroud lines and control lines 935 are not differentiated in this figure, but allow the control electronics and actuators to adjust parachute aperture size, and therefore drag, even while the parachute is operating but firmly anchored to the equipment package 915. Alternatives to this approach include control electronics in the parachute itself, and controllable vents in the parachute to reduce drag (i.e., as an alternative to adjusting aperture size).

If the tether 300 is made up of multiple sections connecting packages 905, 910, and 915 to the lower airship system (not shown), then the equipment packages 910 and 915 are designed to sustain the maximum load anticipated for the system as a whole. This load would be upper bounded by the bursting strength of the tether. Conversely, if the tether is continuous and equipment packages 910, 915 are merely mounted on, or attached to, the tether, the equipment packages could be less robust. However, in this case they are designed to sustain the lift and drag forces associated with the parafoil and parachute.

FIG. 9 also shows suspension lines 940 running from the balloon 900 to the parafoil 920, and additional suspension lines 950 running from the parafoil 920 to the parachute 930. These illustrated lines 940 and 950 should be interpreted as being indicative of a suspension function; additional suspension lines could exist, and the placement of the suspension lines can be adapted to specific designs. However, the purpose of the suspension lines 940, 950 is made evident when considering the zero-wind condition and the need to avoid entanglement between the various elements of the system. Thus, in a zero-wind condition, the parafoil will be suspended from the balloon and will be spaced away from its equipment package 910. Furthermore, it will be in a configuration favoring proper inflation in the wind. No additional bladders of lifting gas are required in the parafoil (although they are not precluded). Similarly, the suspension lines 950 provide support for the parachute, which in a no-wind situation will be spaced-away from its equipment package 915 and be in a configuration favoring proper inflation.

In one example, the lengths of the suspension lines are selected so that, when the parafoil and parachute are inflated, the suspension lines 940 and 950 are substantially slack and do not interfere with the operation of the parafoil and parachute.

The block arrows on the left-hand side of FIG. 9 indicate qualitatively the relative magnitudes of the lift and drag forces generated by the balloon, parafoil and parachute under peak wind loading conditions. The balloon provides the dominant lifting force, since it carries the entire system even in the absence of wind. Surprisingly, for its large size, the drag forces at an altitude of 40 km are generally small even in wind equal to the maximum wind speed encountered by the lower airship. Hence, for the balloon, the lift force is shown as a strong upward arrow and the drag force is shown as a weak (thin) horizontal arrow. The ratio of magnitudes can be 10:1 or 20:1, or even greater. Hence the upper part of the tether, between 905 and 910, will be almost vertical under most operational conditions.

During high winds, the parafoil provides the additional lifting force to ensure that the majority of the tether (the portion extending down to the lower airship) remains relatively vertical. A parafoil can generally achieve a ratio of lift to drag of between 1 and 5, so the parafoil is shown with a drag force that is somewhat weaker than the lift force. The parachute contributes only drag (i.e., in order to help balance the drag experienced by the lower airship).

System-Level Considerations Relating to Atmospheric Density and Lifting Capacity Because of the change in atmospheric density with altitude, and the consequent reduction in lifting capacity with altitude, there is a general incentive to install hardware on the lower airship instead of the upper airship, wherever such a choice is feasible, assuming no overall weight penalty is incurred. Where an overall weight penalty is incurred, more detailed design tradeoffs need to be performed.

One area where a detailed tradeoff is required is power generation. Both airships require electrical power in order to maintain housekeeping functions, control the various controllable structures (such as tether attachment systems, parafoils and parachutes), report their status by e.g. radio, and receive commands. Payload systems must also be supported (generally on the lower airship, although this is not a limitation of the inventive concept). If one limits discussion, for pedagogical reasons, to electrical power generation subsystems which derive from renewable sources, obvious technologies include solar power and wind power (see below). These could be installed on the lower airship, the upper airship, or both airships. The upper airship is generally disfavored as a host platform for satisfying all power generation needs of the system (although not strictly eliminated from consideration) because it is generally more difficult to carry a power generation system of a given weight on the upper airship, as compared to the lower airship. Furthermore, if the majority of the electrical load is associated with the lower airship, a significant penalty may exist in transferring the power to the point where it is needed.

Because of the considerations noted above, one illustrative system relies on either a dual power generation subsystem with power generation on both platforms tailored to the needs of each platform individually, or a single power generation subsystem hosted on the lower airship, with a portion of the power transferred to the upper airship.

In a dual power generation concept, both airships would generate their own power, sufficient to satisfy their needs with margin, using e.g. wind or solar generators, or both. Energy storage subsystems, such as batteries (2500, 2550) or their equivalent (along with power management subsystem (2600, 2650) to handle charging/discharging and battery maintenance) would also be hosted on both platforms, in order to satisfy real-time electrical load requirements during periods of no wind, or darkness. Power requirements on the upper airship are expected to be relatively modest for many operationally useful systems, and could therefore be accommodated with relatively small wind and/or solar power generation subsystems. Power requirements on the lower airship are expected to be larger; providing a separate power generation subsystem on the lower airship, designed to accommodate the needs of the lower airship, removes this weight burden from the upper airship.

In order to further reduce the required lifting capacity of the upper airship, all the power generation needs can be satisfied by the power generation subsystem on the lower airship with some of the power (or energy) being transferred to the upper airship. The energy transfer mechanism will have a weight penalty of its own that is taken into account in the overall design of the system. Means of power transfer include, inter alia: a) AC or DC electrical power transfer via conductive lines embedded in the tether or attached to the tether (or perhaps provided by separate strands of the tether itself (if the tether material can be engineered with either high or low conductivity according to need); b) free-space electromagnetic power transfer (e.g., microwave or laser with an emitter on the lower platform and a receiver on the upper platform); and c) physical transfer of an energy storage device, such as a battery or fuel supply, using a shuttle subsystem running up and down the tether in the same or a similar manner as currently envisioned for a space elevator. Each of these alternatives has a potential weight penalty that needs to be considered. The AC or DC power transfer approach may increase the weight of the tether, which is carried by the upper airship, and there may be a significant loss of power along the length of the tether which would increase the size of the power generation subsystem on the lower airship, to the point where power transfer between the airships is not deemed to be an optimum approach. The free space power transfer approach avoids direct impact to the tether, but involves a weight penalty on the upper airship (for the receiver and power conversion subsystem) as well as the lower airship, and also involves an efficiency penalty which increases the overall size of the electrical power generation subsystem on the lower airship. The physical transfer approach nominally offers high transfer efficiency, but such systems still involve a weight penalty on both platforms (as well as the weight represented by the transfer battery or fuel and the shuttle itself), may potentially require an energy expenditure to move the shuttle up and down the tether, and are relatively unproven in practice.

As a consequence of these diverse considerations, a detailed system design and tradeoff study is needed to determine whether power should be generated on both platforms, or only one platform with a portion of the power subsequently transferred to the other platform. The results will depend on the electrical power needs of the two platforms and the available state of the art in terms of stratospheric wind power generation, solar power generation, and the various power transfer methods noted above.

Wind Power

With two airships tethered together at different altitudes, balancing wind-induced drag forces so that they are effectively stationary (or approximately stationary) with respect to the Earth, each airship will experience an effective ambient wind (although the wind may not be the same for the two airships). It is possible to take advantage of this wind on one or both of the airships, when the wind is present, to generate electric power. A dedicated wind turbine could be used; alternatively, engines (120, 220) and propeller(s) (130, 230), used for propulsion, could be designed to also provide wind-generated electric power when they are not being used for propulsion. This could be used to recharge batteries (2500, 2550) or perform other useful tasks. The extra drag induced by the wind on the wind generator must be accounted in the overall design of the tethered airship system.

The amount of power in wind is derived from the kinetic energy of the air mass. Kinetic energy is $$KE = \left(\frac{1}{2}\right)mv^2,$$

measured in joules, where m is i mass and v is its velocity. For example, a cubic meter of air at approximately 18 kilometer altitude, moving a 1 m/s, has a mass of about 0.2 kg and represents kinetic energy of about 0.1 joule. As wind speed increases, total power goes up for two reasons: a) the kinetic energy of each "unit volume" of air is increased; and b) more "unit volumes" of air become available at a wind generator per unit of time. Hence, total wind power is actually proportional to the cube of wind speed, and is given by $$P_{wind} = \left(\frac{1}{2}\right)A\rho v^3,$$

where A is the area of an aperture (such as a wind-electric generator), p is the density of the air, and v is the speed. The maximum amount of power that can be extracted from wind is 59% of the total (the Betz limit); current state-of-the-art systems can come within 70%-80% of this theoretical limit. For a stratospheric system, I will assume for illustrative purposes that the system can come within roughly 50% of the theoretical limit, or 30% of the total amount of energy contained in the wind. Hence, at an altitude of 18 kilometers, it might be possible to extract 0.03 W with a small wind turbine having an effective aperture of 1 m², in ambient wind of 1 m/s. This is not very much. However, the available power will scale linearly with aperture size and as the cube of wind speed. So, for example, a 30 m² aperture (diameter ~6 m) can potentially generate about 1 W of power in wind of 1 m/s, and 1000 W of power in wind of 10 m/s. Larger turbines (or equivalent) can generate more power, Thus, an airship with a moderate-sized wind-electric generator, and designed to be frugal in its use of electric power, might be self-sustaining for an indefinite period in the projected wind conditions.

Both the lower and upper airships can support wind-electric generators, although the designs might vary to match the anticipated ambient conditions. The ambient atmospheric density at the upper airship is low compared to the lower airship; however the wind tends to exhibit a higher velocity. Thus, it is still possible to generate useful power from wind at the upper airship. Alternatively, in order to minimize the weight carried by the upper airship, the lower airship might support a wind-electric generator and provide a portion of the electric power to the upper airship via any of the transfer mechanisms discussed above.

A traditional prior-art HALE airship in the lower stratosphere consumes a significant amount of fuel (or battery charge) in order to perform station keeping in high winds; conversely, its power requirements during calm conditions are relatively modest. If the power requirement for station keeping in high wind is substantially eliminated due to drag balancing with a tethered airship operating at a higher altitude, a relatively modest wind power generation capability might provide for effectively indefinite operation without refueling or replenishment, and without reliance on solar power.

If separate wind power and airship propulsion systems are provided (e.g., a wind power generation subsystem and a separate electric motor and e.g. propeller-driven propulsion system), excess wind-generated electric power could be used in real time (or stored in a battery for later use) to drive the electric motor and e.g. propeller-driven propulsion system. This would provide another mechanism to maintain station-keeping in the case of unbalanced drag forces, or provide for commandable movement of the airships from one location to another.

Solar Power

Photovoltaic power systems and other solar power subsystems appropriate for use an airship system exist and are continuing to mature rapidly. Currently-available technology allows for relatively light-weight power generation subsystems that would be suitable for both a lower stratospheric airship and an upper stratospheric airship, particularly with drag forces essentially neutralized. Solar flux is highly predictable, and many solar power systems, such as photovoltaic systems, have no moving parts. This can significantly improve the reliability of a stratospheric system during long duration missions.

A hybrid system, combining a relatively small complement of solar cells (2700, 2750), and a relatively modest regenerative wind power system, might provide a reliable dual-source energy supply that can take advantage of the dissimilar benefits of wind and solar power.

Power Generation Via Ambient Electric Field

A vertical voltage gradient exists in the atmosphere. Typical values of the gradient, near the Earth's surface, are on the order of 100 V/m. This vertical voltage gradient has been used, for example, to power a small electric motor or toy from a kite flying a few hundred feet above the surface. In this prior-art system, the kite supports a foil collector and a thin conductor running along the kite string (or taking the place of the kite string) allows an electric current to flow to ground. The electric motor, toy, or other small device is interposed between the kite's conductor and Earth ground, and so perceives a voltage difference across its terminals and also a small electric current. While the voltage difference is large, the current is small because it is limited by the rate of electrostatic charge buildup on the kite. Hence total available power is generally small.

Electrostatic charge buildup can occur when two dissimilar materials are rubbed together, or brought into close contact and separated (as with air across the surface of certain materials, or silk rubbed on a glass rod). This phenomenon is referred to as triboelectric charging. Air has a tendency to give up electrons (thereby becoming positively charged), while other materials such as polyurethane, kapton, and Teflon have a tendency to accept electrons (thereby becoming negatively charged).

In the present system, the airships have large surface area and the vertical separation between the airships is on the order of tens of km. One method of generating power is, therefore, to encourage and promote a flow of electric current from one airship to another, driven by the ambient electric field, with one airship acting as a net source of electrons and the other acting as a net sink (i.e., bleeding electrons back into the atmosphere). However, it should be recognized that the typical potential difference between the lower and upper stratosphere is much smaller than one might calculate based on near-Earth measurements. The voltage gradient decreases exponentially with height, and one measurement of the vertical electric field performed at a height of 31 km (in a polar region) indicated a voltage gradient of only 0.2V/m. If this value is used as a rough average for the environment of the tethered airships, total expected voltage difference under typical operating conditions would be on the order of 4000V for an altitude separation of 20 km.

The available power can be no larger than the product of the voltage difference times the current flowing between the airships, and could be much lower than this value if transmission losses are significant. The amount of current that can be generated via tribolectric charging is generally predicted to be small. One estimate of maximum charging rate, provided by the United States Air Force, is:

$$I_t = I_c \times SA \times V / 600$$

where $I_t$ is the static charging rate (the maximum steady-state current flow that could be sustained by the system), $I_c$ is the charging rate per square meter of frontal surface area (a function of the aircraft surface material and the operational environment), SA is the frontal surface area of the aircraft or airship, and V is the velocity in knots.[2] For a metallic aircraft flying through precipitation in the troposphere, a suggested value for $I_c$ is 400 uA/m². In the absence of precipitation, but other factors held constant, the charging rate in the troposphere is much lower. Based on this expression, even a large frontal area for an airship (such as 1200 m²) and a high wind speed (such as 50 meters per second) would result in a current no higher than 80 mA in precipitation (and substantially less in the absence of precipitation, or at lower wind speed). Multiplying by 4000V, the total power available via the ambient electric field, for two airships vertically separated in the stratosphere by 20 km, is predicted to be substantially less than 300 W—perhaps on the order of only a few watts in the absence of precipitation, and at lower wind speeds. Therefore, it seems unlikely that a triboelectric power generation system could generate significant amounts of power, or that the weight penalty of such a system could be justified when compared to solar or wind-based alternatives.

[2] Test Operations Procedure (TOP) 1-2-511 Electromagnetic Environmental Effects System Testing.

Nevertheless, if the physics of triboelectric charging in the stratosphere allows for significant charging rates under typical operating conditions (higher charging rates than suggested by the data provided above), a power system based on the ambient voltage gradient and achievable current flow could potentially be built and used by the tethered airships. In order to explore this question, triboelectric charging rates in the stratosphere would have to be assessed for various candidate materials and structures. The assessment could proceed through testing of small patches of candidate materials and structures (2800), connected to a measurement system of an airship operating in the lower stratosphere, with excess charge eventually bled-off through standard discharge structures (2850). Initial materials for consideration include polyurethane, KAPTON and TEFLON (among others), which all tend to accept electrons from the air. One or several of these materials could be coated on a conductive film which would then act as the electrode of an electric circuit spanning the test measurement system and the discharge structure. Care should be taken to engineer the structure to promote electron transfer from the outer coating (i.e., the material such as polyurethane, KAPTON or TEFLON selected because of its tendency to accept electrons from the ambient atmosphere) to the conductive film.

If a suitable material and electrode structure can be found, which promotes charge transfer from the atmosphere and to a conductive element, one could then examine the predicted power generation capability for a tethered airship system as well as the projected weight penalty, to assess the benefits of such a system in comparison to the competing systems based on wind and solar power. The flow of electric current would allow useful work to be performed on both the lower and upper airship. Furthermore, the flow of electric current along the tether (in support of this or alternative power transfer strategies discussed previously) provides for powering other devices and sensors that may be spaced along the length of the tether.

One possible electrode structure was recently reported by researchers at MIT, in relation to an enhanced photovoltaic solar cell. (Dang et al., (April 2005), Virus-Templated Self Assembled Single-Walled Carbon Nanotubes for Highly Efficient Electron Collection in Photovoltaic Devices, *Nature Nanotechnology*). The researchers used viruses to control the growth of carbon nanotubes within the cell, where the carbon nanotubes provided a conductive medium for charge transport. A similar structure, integrated at the microscopic level within a material that promotes triboelectric charging, could provide a convenient structure to promote charge transfer to a larger conductor.

Deployment Methods

Figure 10:
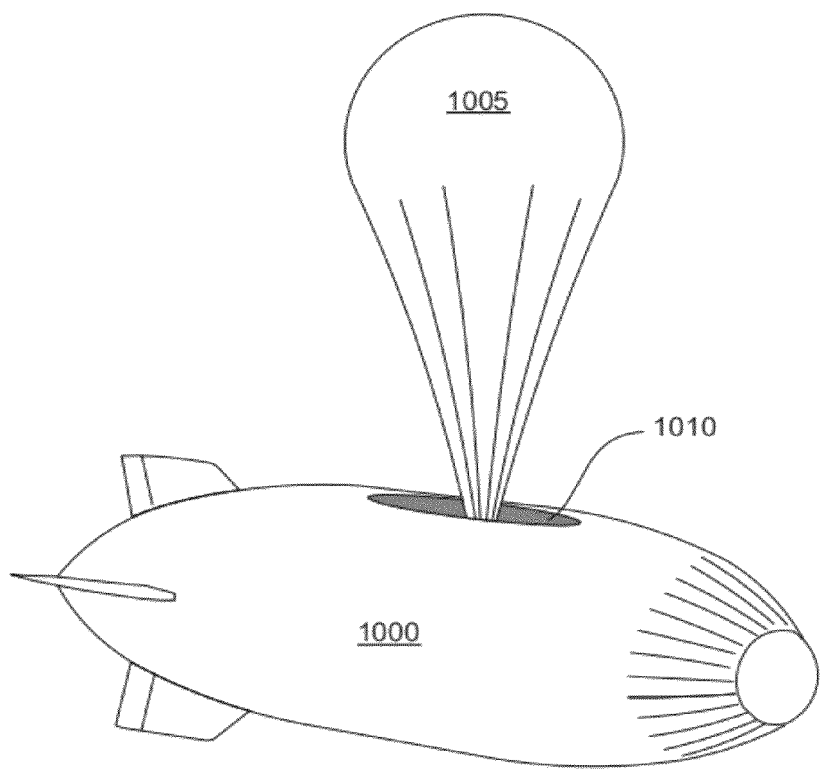
FIG. 10 is a perspective view of a tethered airship system allowing one airship or balloon to be deployed from another, according to one example of principles described herein.

A variety of deployment methods can be used to launch and position the tethered airship system. Listed below are five illustrative deployment methods with differing levels of pre-launch level of airship integration:

1) The two airships, one of which contains (or carries) the tether, might be inflated and launched separately, followed by in-flight mating and attachment of the tether to the other airship (see, for example, U.S. Pat. App. 13048625, to Stephen Heppe, entitled "Systems and Method for Long Endurance Airship Operations, which is incorporated herein by reference in its entirety); or
2) The two airships and the tether might be assembled and inflated on the ground, with the tether connecting the two airships (partially spooled in at least one of the attachment/deployment subsystems), and the two airships launched together (or close together) in time;
3) The two airships could be assembled, inflated, and mated together on the ground, with the tether substantially spooled in a tether attachment/deployment subsystem, followed by demating and separation (and tether unspooling between the two airships) after launch;
4) The two airships could be assembled, one of them inflated, and the two mated together on the ground with the deflated airship carried as external cargo on the inflated airship and the tether substantially spooled in a tether attachment/deployment subsystem. Following launch, the deflated airship is inflated, demated and separated, and the tether is unspooled as the airships separate; or
5) One airship and the tether could be stowed within the other airship for launch and low-altitude flight, and subsequently deployed. For example, after reaching the lower stratosphere, the inflated airship might enter a period of drifting flight in order to minimize aerodynamic forces. At this point, the deflated airship could be deployed and inflated. FIG. 10 shows an illustrative lower airship 1000 deploying the upper airship 1005 from an internal cavity 1010.

Maneuvering

In the inventive concept, at least one of the two airships is equipped with a traditional propulsion and guidance system such as a system of one or more propellers driven by electric motors with electric power from a real-time power source (e.g., solar cells) or storage batteries. The propellers may be "vectored" to provide vectored thrust, or fixed with respect to the airship with guidance and maneuvering provided by aerodynamic control surfaces (rudder, elevator, and the like). In addition, parafoils associated with the system are controllable to adjust lift and drag forces in conditions where the airship is experiencing an ambient wind. Parafoils can also be used to provide lateral thrust (i.e., perpendicular to the ambient wind vector).

The electric propulsion and guidance system, installed on one or both airships, can be used to maneuver in very low wind or zero wind conditions simultaneously experienced by both airships. It can also be used to provide a partial or complete "stationkeeping force" when there is no wind at one airship, but the other airship experiences a wind within the limits of the propulsion system to counteract. For example, if the lower airship is equipped with a propulsion and guidance system, it can counteract low winds in the lower stratosphere when there are zero or low winds in the upper stratosphere. Similarly, this same airship could counteract low winds in the upper stratosphere when there are zero or low winds in the lower stratosphere.

The combination of parafoils and parachutes can be used to maneuver in nominal, moderate, and high wind conditions. Specifically, with countervailing winds in the lower and upper stratosphere, and the airships mutually "trimmed" to provide stationkeeping near a commanded latitude and longitude, the combination of parachutes and parafoils can be used to introduce a net thrust in any direction. Parachutes can be marginally opened or closed to create a net thrust in the east/west direction, and the parafoils can be controlled/trimmed to provide a net north/south thrust as well as net vertical lift to increase altitude, or reduction of lift in order to reduce altitude. Hence, the inventive concept provides 3D maneuvering for stationkeeping and repositioning with minimal expenditure of energy.

Illustrative Tethered Airship Example

In one embodiment, both airships are connected by a tether[3] and contain a standard compliment of housekeeping and communications and control equipment (not necessarily identical between the two airships) associated with effective human control. This includes navigation and position determining systems, aerodynamic control systems, telemetry and command communications systems, computational resources and the like.

[3] While the description herein may refer to "a tether" or "the tether", it should be understood that the tether could comprise several lengths connected end-to-end, possibly with passive or active subsystems interspersed with, and providing a tension member between, the several lengths. An example is illustrated in FIG. 9.

The upper airship additionally comprises:
a) a parafoil and parafoil control subsystem adapted to adjust dynamic lift and drag;
b) a parachute (drogue chute) and parachute control subsystem adapted to adjust drag;
c) a tether attachment subsystem;
d) a solar power generator, such as a photovoltaic system adapted to generate electric power during periods of daylight, storage batteries, and associated power management and distribution systems.

The tether attachment subsystem may be adapted to control the point at which tension forces are applied, and to also control the angle of attack of the airship, as illustrated in FIG. 3; alternatively, the tether attachment system may comprise a single fixed point of attachment as suited to a spherical balloon, or a distributed system that also comprises the parachute and parafoil anchor points (equipment assemblies) as illustrated in FIG. 9 (i.e., in an embodiment where the parachute and parafoil equipment assemblies serve as connecting members between separate lengths of the tether).

The lower airship additionally comprises:

e) a parafoil and parafoil control subsystem adapted to adjust dynamic lift and drag. The parafoil may be partially filled with a heavier-than air gas, such as carbon dioxide, to keep the parafoil below the airship in zero-wind conditions and also to facilitate inflation;

f) a parachute (drogue chute) and parachute control subsystem adapted to adjust drag;

g) a tether attachment/deployment subsystem adapted to control the length of the tether, the point at which tension forces are applied to the lower airship, and the angle of attack of the airship relative to the ambient wind;

h) a solar power generator, such as a photovoltaic system adapted to generate electric power during periods of daylight, storage batteries, and associated power management and distribution systems;

i) a wind generator adapted to generate electric power during periods of relative wind;

j) a propulsion and guidance system, such as a system of electric motors and propellers, optionally including aerodynamic control surfaces, adapted to provide propulsion (thrust) to the lower airship. The propulsion system can optionally be integrated with the wind generator.

The lower airship can also comprise a power generation system based solely on solar or wind, as opposed to a combination of the two. It is expected that the lower airship, at least, will additionally contain a payload; however, this is not a required element of the inventive concept. Possible payloads include radar, electronic warfare, and communications relay packages, atmospheric sensing packages (e.g., aerosols, temperature, pressure, humidity), remote sensing and earth sciences packages (IR, visible, ultraviolet sensors), astrophysical and astronomical sensors, and "beamed power" subsystems (if significant amounts of excess power can be generated on the airships). The tether itself, and a possible physical shuttle running on the tether, might represent a useful prototype or testbed for a future space elevator.

Sizing and Analysis of an Illustrative Tethered Airship Example

This section provides additional technical and operational details for an embodiment structured along the lines discussed above, where the lower airship is designed to have a nominal operational altitude (neutral buoyancy) of 18 km, and the upper airship is designed to have a nominal operational altitude of 37 km while accounting for the weight of a fully-deployed tether. Both airships are "solar regenerative" designs (i.e., no wind generators) and incorporate parafoils and parachutes. The tether is 30 km long, comprised of Kevlar, and assumed to weigh 600 kg. Furthermore, the length of the deployed tether is adjustable based on the action of a reel assembly associated with the lower airship, and the system is designed to operate with a vertical separation as large as 19 km (with the lower airship operating at 18 km and the upper airship operating at 37 km), or as small as 8 km (e.g., with the lower airship operating at 19 km, and the upper airship operating at 27 km).

In many of the design elements discussed below, conservative sizing estimates have been used. It is expected that more detailed assessments of winds-aloft, consideration of new materials, and refinement of operating strategies, will lead to reductions in weight for one or both of the airships, as well as the tether.

While the inventive concept uses different airship designs than prior art systems, with new combinations of elements (such as parachutes and parafoils), a long tether, and significantly different subsystem sizes and characteristics tailored to the tethered operations concept, some of the design coefficients used for the illustrative sizing exercise described below are adapted from the NASA Concept 14 stratospheric airship identified in NASA/TP-2007-214861, specifically the communications relay variant designed to operate at an altitude of 18 km. For example, the same drag coefficient is used so that drag is assumed to scale with surface area, and the same ratio of propulsion subsystem power to weight is used. The NASA Concept 14 stratospheric airship is a solar regenerative design intended for a six month mission (although simulations apparently indicated that a full six month mission might not always be achievable, depending on weather conditions and time of year which affects solar flux). The NASA airship is approximately 200 meters long and has a lifting volume of approximately 350,000 $m^3$. The lifting gas is helium (although NASA later concluded that hydrogen would be better). Gross vehicle weight (GVW) is approximately 36,700 kg, of which over 24,000 kg is batteries. The large complement of batteries is needed to sustain the airship through long periods of high wind, when propulsion needs exceed the electrical power that can be made available directly from the solar cells. In the present invention, most of these batteries are removed.

For the illustrative sizing example provided here, sizing estimates have been provided to at most three significant figures. A refined designs would consider the characteristics of new materials and technologies, and would also be based on operational simulations and known weather patterns in the intended region(s) of operation.

For purposes of illustration, hydrogen is used as a lifting gas instead of helium. Hydrogen is slightly more efficient as a lifting gas then helium, and its diatomic molecular structure tends to minimize leakage concerns as compared to helium. While hydrogen is explosive in some situations, this risk can be managed for an unmanned airship intended to operate in the stratosphere where the amount of oxygen is limited (i.e., the primary risk is at low altitude, and during launch and recovery).

NASA Concept 14 has a hull envelope area of 29,500 $m^2$. The mass of the hull, including fabric, suspension, reinforcing, access/maintenance provisions, ballonets, tail structure, and other features was estimated at about 8700 kg. In a refinement phase of their analysis, NASA separately identified a fabric material, Vectran HS, which was deemed suitable for a refined design. NASA assessed an areal weight of 170 $g/m^2$ for this material including coatings and bondings, and also assumed an additional 15% for seams, 10% for structural interfaces, and 40% for ballonets. Thus, a rough estimate of total hull mass could be generated by assuming an areal weight penalty of 280 $g/m^2$. The hull and ballonets were designed for a maximum pressure differential, between inside and outside (ambient) pressure, of about 1 kPa.

In the absence of wind, the lower airship will operate at 18 km and the upper airship will operate at 37 km. The tether will be partially spooled on the lower airship, but this extra weight penalty is exactly balanced by the "excess lifting force" available from the upper airship (which was designed to operate at 37 km while sustaining the full weight of the tether). Hence, the two airships remain at their nominal altitudes although the tension on the tether, measured at the lower airship, represents the spooled weight of 220 kg, or roughly 2200 Newtons.

In the present example, the vertical separation between the airships is adjustable to enable the selection of suitable wind patterns (and ambient densities) that can be used to equalize the drag forces. When the vertical separation is reduced below the 19 km associated with their neutral buoyancy designs, and ignoring propulsive and dynamic lift effects, the lower airship will be above its neutral buoyancy altitude and the upper airship will be below its neutral buoyancy altitude. This raises two design issues: a) the lower airship will experience greater pressure differential between its internal pressure and the external pressure (i.e., due to the lower ambient pressure at altitudes above 18 km), requiring a stronger hull; and b) the upper airship will experience an increase in ambient pressure, meaning that it will lose rigidity and tend to collapse into a looser and more elongated shape, with a "bubble" of hydrogen at the top. Most of the change in altitude is experienced by the upper airship, but both airships are affected. In order to accommodate this effect for the lower airship (upper airship design is discussed later, below), without relying on dynamic lift or propulsive forces that consume power, it has been assumed that the lower airship operates in a predefined altitude band with an additional 1 kPa of pressure variation allowed, relative to the NASA baseline of 1 kPa. This allows operation of the lower airship to an altitude of 19 km instead of 18 km, even though its nominal buoyancy is insufficient to achieve this altitude. In order to accommodate a total pressure differential of 2 kPa, the hull weight allocation (a sizing coefficient) has been increased to 560 g/m², instead of the 280 g/m² adopted by NASA. Of course, newer materials could potentially provide the necessary strength at a lower weight penalty.

Drag at a particular airspeed, for the basic airship without considering the contribution of parafoil and parachute, is scaled from the NASA Concept 14 design based on the ratio of hull surface areas. For the illustrative design described here, which results in a hull surface area of roughly 9,000 m², the drag on the lower airship at 18 km and 56 m/s is somewhat less than 7 kN. By way of comparison, the NASA concept experienced peak drag of slightly higher than 22 kN in the same conditions.

In terms of the propulsion system, NASA Concept 14 was sized to maintain station-keeping at 18 km altitude in ambient winds of 56 m/s. This required mechanical systems weighing 3200 kg. In the sizing example here, the lower airship is smaller than the NASA baseline and is only designed to sustain an airspeed of 20 m/s ignoring the drag contribution of the tether and upper airship (the majority of the station-keeping capability is achieved by drag equalization). The size of the propulsion system depends on the desired peak airspeed relative to the airmass, and the size of the entire airship and its overall drag, but for the final illustrative design discussed here, the propulsion system would weigh approximately 125 kg in order to sustain an unencumbered airspeed of 20 m/s. It is noted that this is a relatively low weight penalty, and there may be a benefit in designing for a greater airspeed since this would enable the lower airship, in calm conditions, to completely counteract a strong wind experienced by the upper airship. A statistical analysis of expected wind conditions could be employed to determine the benefits of such a redesign. However, for this illustrative example, the design point of 20 m/s is used. This airspeed requires an expenditure of roughly 50 kW of electrical power.

The NASA Concept 14 required a large complement of solar cells and batteries in order to maintain station-keeping in peak wind conditions (56 m/s). The present invention relies primarily on equalization of drag instead of propulsive power, so most of this weight penalty can be removed. Nevertheless, there is still a need for electrical power to operate onboard systems, including the parachutes and parafoils, and provide for propulsion using a traditional electric-driven propulsion system (including either vectored thrust or aerodynamic control surfaces) to compensate for partially unbalanced drag forces, provide an extra upward or downward force, allow for launch/recovery and propulsion to/from the mission area (or change of mission area), and the like. The necessary complement of solar cells and batteries will depend on the results of full mission simulations in a target environment or range of environments; for this illustrative sizing exercise, the lower airship is assumed to carry 60 kg of solar cells and 1100 kg of batteries. Hence, the overall energy system is assumed to weight approximately 1200 kg. NASA has provided a discussion of alternative solar regenerative concepts, including water electrolysis and fuel cells.

As noted above, the illustrative design here results in peak drag of about 7 kN. In order to maintain a relatively vertical tether (less than 45 degrees with respect to the vertical), this same force must be applied as a "negative buoyancy" on the lower airship and a "positive buoyancy" on the upper airship. In order to size the necessary parafoil for the lower airship, and develop an estimate of the weight penalty, the published results for the "Fastwing" ram-air-filled parafoil [Benolol, Zapirain and Ramassar] are used with an areal weight penalty of 100 g/m² for the parafoil fabric. This is slightly more than half the areal weight penalty of the NASA Concept 14 hull material, which was able to sustain a pressure differential of 1 kPa. The Fastwing airfoil can achieve a coefficient of lift ($C_L$) of 0.8, but for the lower airship I have assumed a mid-range value of 0.5 in order to allow $C_L$ (and angle of attack) to be varied in flight, in real time, in order to provide an additional degree of freedom.

The parafoil also contributes to drag, and this additional contribution to drag must be considered in the overall design. At a $C_L$ of 0.5, the Fastwing provides a ratio of lift to drag of about 3:1. If the total negative lift generated by the parafoil is required to match total drag for the combination of the lower airship and the parafoil together, this can be achieved when parafoil drag is one-half of airship drag and the negative lift has a magnitude of roughly 10.5 kN. This results in a parafoil lifting area of about 110 m². The areal weight penalty is tripled to account for upper and lower airfoil surfaces and cell membranes. This results in a weight penalty of about 33 kg. An additional 2 kg is allocated for shroud lines to connect the parafoil to its control and anchor points, resulting in a total weight for the parafoil system (exclusive of its control electronics and actuators) of 35 kg. The shroud lines are assumed to be constructed of the same material as the tether, although with a smaller diameter consistent with the shroud loading requirements. Many alternative parafoil designs are possible, but it is clear that the necessary dynamic lift forces can be achieved with a relatively small weight penalty compared to the total weight of the airship.

A parachute on the lower airship is not strictly required, but can be used to minimize control activity on the upper airship and also facilitate 3D maneuvering. In the illustrative concept, a small parachute is included with a weight (including shroud lines) of 10 kg.

The lower airship is also assumed to carry a payload of 212 kg and a tether attachment/deployment system weighing 50 kg. Actuators, control electronics, etc., for the parafoil and parachute systems are assumed to weigh 50 kg total.

With the above design considerations and assumptions, the lower airship is 111 m long, comprises a lifting volume of 60,000 m³, and has a GVW of 6,700 kg. The hull comprises 5,100 kg of this total and has a surface area of 9,000 m². Many design adjustments and refinements will be apparent to those skilled in the relevant arts.

The upper airship is based on the configuration of FIG. 9 although the pumpkin-lobed balloon is replaced with a dirigible-shaped airship in order to maintain consistency with the drag coefficient adopted in the NASA study. It is constructed to satisfy an areal density (i.e., for its entire lifting hull) of 60 g/m² which accounts for e.g. the raw material of the hull to allow for balloon survivability given the drag forces experienced by the present invention.

The energy needs of the upper airship are relatively modest since it has no propellers or equivalent propulsion system relying on internal power. However, it still needs electrical power for housekeeping functions, computers, control communications, and to control the parafoil and parachute. As a consequence, for illustration, solar cell mass of 2 kg and battery mass of 25 kg is assumed.

The tether is assumed to weigh 600 kg (considering all tether elements between the upper airship and the lower airship). An additional 100 kg is allocated for structure (905, 910 and 915) including the control electronics and actuators associated with the parafoil and parachute.

The parafoil itself is sized based on the need to achieve a lifting force of roughly 11 kN at an altitude of 37 km, in wind of 56 m/s. Because of the low air density at that altitude, the parafoil in this example is relatively large. Using the same Fastwing design assumed earlier, but adopting the maximum reported $C_L$ of 0.8, the wing area must be 1370 m². With a 4:1 aspect ratio, the wing would be roughly 74 m×20 m. It is assumed to be constructed of material which results in an areal mass density of 26 g/m². As with the parafoil for the lower airship, the areal weight penalty for the raw material is tripled to account for upper and lower airfoil surfaces and cell membranes. This results in a parafoil weight of 107 kg. With shroud lines added (7 kg total to allow for lengths of 150 m), the total is roughly 114 kg. This is a significant mass for the upper airship. A more detailed design study, considering the actual stresses on the parafoil, may conclude that a lighter weight can satisfy the design requirements with currently-available materials. Conversely, future materials may offer lower weight for the same performance.

When operated at $C_L$ of 0.8, the Fastwing can achieve L/D of 4:1. This implies that the parafoil will contribute an additional 2.6 kN of drag to the upper airship, which itself experiences roughly 1.7 kN of drag at 37 km altitude and wind speed of 56 m/s. Thus, the parachute of the upper airship must generate roughly 6.2 kN of drag. This yields a total drag force of 10.5 kN (at 37 km and 56 m/s), which matches the total drag force experienced by the lower airship. The required parachute has a surface area of roughly 900 m² and represents a weight penalty of 28 kg including the parachute and shrouds.

A total of 100 kg is allocated for the combination of structures 905, 910 and 915 illustrated in FIG. 9, comprising the tether attachment, parafoil anchor and control, and parachute anchor and control.

With these design considerations, the upper airship is under 650,000 m³ in volume and under 250 m in length. It has a GVW of 3560 kg. Of this total, the dirigible hull weighs 2680 kg, the tether weighs 600 kg, the parafoil subsystem weighs 114 kg, and all other subsystems combined weigh roughly 170 kg. In the peak design condition of 56 m/s, each airship experiences total drag forces on the order of 11 kN and the tether design (50 kN) is adequate. Potentially, subject to verification through simulation or analysis, a lower-strength tether could be used in order to save weight which could then be allocated to other subsystems or payloads, or used to reduce the size of the upper airship.

In order to minimize electrical load on the upper airship, and therefore the required solar cell and battery complement, the overall system can be operated with the objective of leaving the upper airship in a relatively fixed configuration for long periods of time (to the extent this can be achieved), with lift and drag forces modulated by the lower airship. Hence, this is one reason to equip the lower airship with a parachute that can be controlled for variable drag.

It should be recognized that the design of the upper airship is driven in large measure by its high nominal altitude of 37 km. If mission simulations indicate that drag forces can be equalized reliably at lower operational altitudes, the design of the upper airship can be eased.

Operational Considerations

Figure 11:
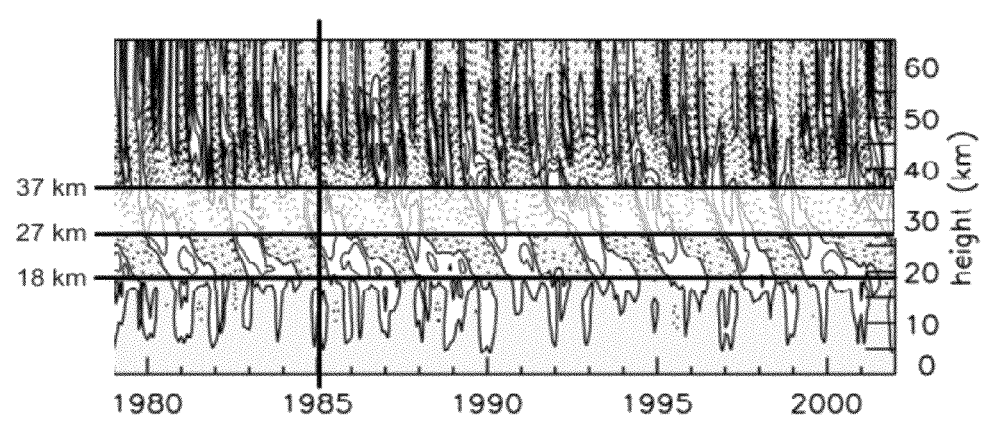
FIG. 11 is a detail taken from FIG. 5.

Generally speaking, winds in the upper stratosphere are stronger than those in the lower stratosphere and move in the opposite direction (e.g., east-to-west at one level versus west-to-east at another). This was illustrated in FIG. 5, a detail of which is provided in FIG. 11. This figure is annotated to show a nominal altitude of 18 km, associated with the lower airship in the sizing example discussed above, and an altitude band of 27-37 km, associated with the upper airship in the sizing example discussed above (the lower airship operates in a band from 18 to 19 km, but only the lower altitude is indicated). Also, in FIG. 11, a vertical line indicates a particular instant of time at the beginning of 1985. As may be seen, the lower stratosphere was experiencing easterly winds during this period of time with an average speed of about 10 m/s, and the upper stratosphere was experiencing westerlies with average speeds in excess of 10 m/s at altitudes in the range of 30 km. A system of tethered airships, as contemplated by the present invention, could equalize drag forces in this environment. The reader may introduce additional vertical lines to verify that, in general (although not always), the conditions for drag equalization exist.

While drag equalization is generally feasible, there are times when the winds blow in the same direction (although this usually occurs when wind speeds are low), and there are times when the upper-stratosphere wind, at a given altitude, is slower than the wind in the lower stratosphere (e.g., at an altitude of 18 km). In order to accommodate these conditions, the invention (and the examples given above) allow the altitude separation between the airships to be adjusted. Generally, this involves the lower airship "reeling in" the upper airship. This takes work since the upper airship becomes increasingly buoyant once it is below its nominal operating altitude. The energy subsystem of the lower airship (e.g., solar cells, batteries, and energy management subsystems) must be designed with this potential operating load in mind, although this capability will not be exercised continuously. Some of the energy expended to "reel in" the upper airship can be recovered when the upper airship is subsequently allowed to go to a higher altitude.

Nominal values of atmospheric density and pressure are tabulated below for altitudes of 18, 19, 27 and 37 km.

TABLE 1

Nominal values of atmospheric density and pressure

| Altitude (km) | Density (g/m³) | Pressure (Pa) |
|---|---|---|
| 18 | 120 | 7505 |
| 19 | 103 | 6410 |
| 27 | 29 | 1847 |
| 37 | 6 | 420 |

As noted above, the lower airship is designed to operate with a pressure differential (internal to external) of 2 kPa, 1 kPa greater than the NASA baseline, which allows operation as high as 19 km. At this altitude, the density differential (120−103=17 g/m³) implies a negative buoyancy for the lower airship (which has lifting volume of approximately 60,000 m³) of 1020 kg or 10,200 N. The upper airship has a total lifting volume (at 37 km altitude) of 650,000 m³. The ambient pressure is about 420 Pa and the lifting volume is assumed to be pressurized to a differential pressure of 100 Pa. So internal pressure=520 Pa. The ambient atmospheric density is 6 g/m³ and $H_2$ has a relative density to the atmosphere (primarily $N_2$ at same pressure) of approximately 1:14, so the density of the hydrogen inside the lifting volume is roughly 6*520/14/420~0.5 g/m³. Thus, the lifting capacity of the upper airship at design altitude (the difference in density between the internal hydrogen and the external atmosphere) is roughly 6−0.5~5.5 g/m³. This unit lifting capacity, multiplied by the volume at altitude, matches the GVW of the upper airship with all of its associated systems and the tether. When the upper airship is operated instead at 27 km altitude, the pressure differential (1847 Pa vs. 520 Pa) implies a reduced volume of 520/1847~28% of the original. The density of the hydrogen lifting gas is now approximately 1.8 g/m³, versus the ambient atmospheric density of 29 g/m³. Thus, the total buoyancy or "lifting force", expressed in kg, is roughly $$B(\text{upper};27\text{ km})=(27.2\text{ g/m}^3)*0.28*650,000\text{ m}^3=4950\text{ kg}$$

Subtracting the GVW of 3560 kg, the excess buoyancy is 1390 kg which is equivalent to roughly 13,900 N when expressed as an actual force. Adding this positive buoyancy to the negative buoyancy of the lower airship (−10,200 N), results in a net excess buoyancy of +3,700 N tending to take the tethered combination to a higher altitude. The excess lifting force can be compensated with propulsion and dynamic lift at the lower airship when winds at the lower airship are above a necessary lower threshold. When winds are strong, the parafoils and parachutes can be used to trim the forces experienced by the system.

It is also noted that, at this smaller vertical separation, the positive and negative buoyancy forces are such that the tether can be kept relatively "vertical" with smaller contributions from dynamic lift. As for the drag on the upper airship, it will depend on the prevailing wind speed as well as the coefficient of drag. The parachute and parafoil can be used to increase drag as needed to match the drag on the lower airship, with fine adjustments using both the upper and lower parafoils and the upper and lower parachutes to bring the system into equilibrium.

Under very low wind speed conditions in the upper stratosphere, the parafoil will not fully inflate. For example, in the sizing exercise presented above, the parafoil and its shrouds weigh roughly 114 kg. If the upper airship is being operated near the top of its operating range (37 km), then even at max $C_L$, the parafoil can only overcome this weight burden at an airspeed of roughly 18 m/s. At lower altitudes, where the density of the atmosphere is greater, the parafoil inflates and becomes effective at lower airspeeds. It should be noted that the stall speed of the airfoil (which has not been calculated) also represents a lower bound on airspeed for effective use of the parafoil.

In general, the parachute will inflate at lower airspeeds than the parafoil, allowing drag management to occur at lower airspeeds than buoyancy management.

Figure 12:
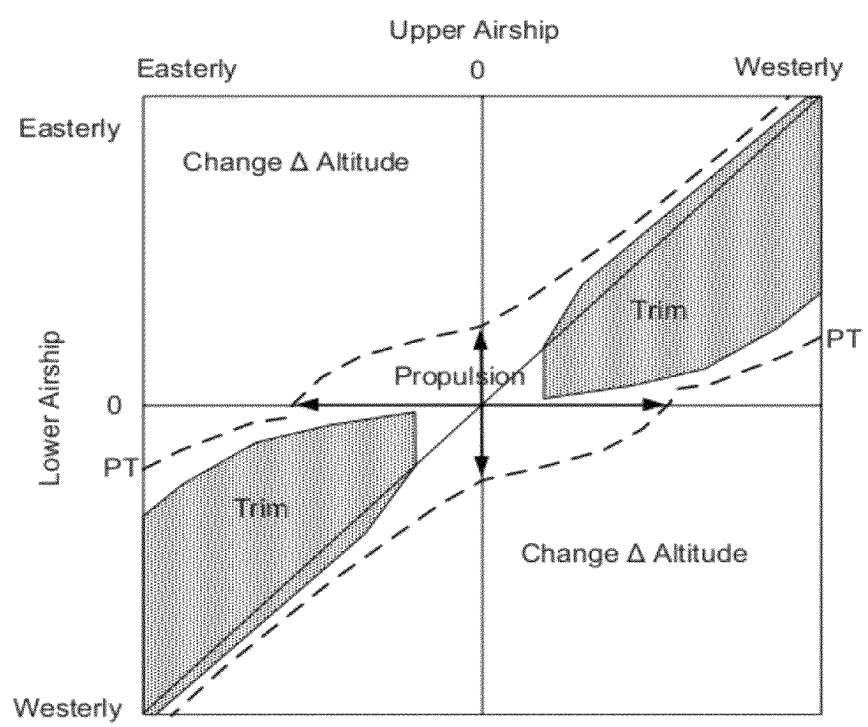
FIG. 12 is a state diagram of a potential embodiment of the present invention, with respect to scaled dynamic pressure at a lower and an upper airship, according to one example of principles described herein.

Different operating conditions imply different operating strategies for the tethered airships. FIG. 12 illustrates several strategies plotted against a backdrop of dynamic pressure (density times airspeed squared) for the lower and upper airship, illustrating potential operating strategies for various combinations of easterly and westerly winds at the lower and upper airship. The plotted values are scaled so that equal airspeeds at the nominal operating altitudes of 18 and 37 km exist on the main diagonal running from lower left to upper right. The diagram should be interpreted qualitatively rather than quantitatively; however, certain features will now be explained:

a. With reference to the sizing example given above, the lower airship is designed to achieve a propulsive airspeed of 20 m/s. This is indicated qualitatively by the bold double-headed vertical arrow in the center. When there is no wind at the upper airship, the lower airship can perform stationkeeping with winds up to 20 m/s in either direction. Under these conditions, one would attempt to minimize drag effects by stowing or furling the parafoil and parachute associated with the lower airship (the diagram assumes that these drag effects can be made effectively zero, although this may not be achievable in practice), and rely on propulsive thrust only.

b. Similarly, when there is no wind at the lower airship, but there are winds at the upper airship, the lower airship can compensate with its propulsion system. This is indicated by the bold double-headed horizontal arrow. Under these conditions, one would attempt to minimize drag effects by stowing or furling the parafoil and parachute associated with the upper airship (the diagram assumes that these drag effects can be made effectively zero, although this may not be achievable in practice).

c. The shaded regions indicated as "Trim" are the regions where drag forces can be equalized using the parafoils and parachutes described. Generally, such equalization requires the winds to be in opposite directions, with upper winds stronger (faster) than lower winds, and both strong enough to properly inflate the parafoils and parachutes (or at least the parachutes, at low speed). However, in many operational situations, and depending on the detailed design of the system, drag forces may be equalized even if the upper winds are slightly slower than the lower winds. This is indicated qualitatively by the trim region extending slightly across the main diagonal of the figure. For example, in the sizing exercise described above, the parafoil of the lower airship was sized to provide negative lift sufficient to equal the total drag on the lower airship and parafoil combined, in peak wind conditions, at a $C_L$ of 0.5 and L/D of 3:1. However, as was noted earlier, if some of the tether is already spooled on the lower airship, the tether is already under tension. This means that the lower airfoil does not need to work as hard, and can be operated to generate less lift and drag. This means that the total drag forces could actually be equalized even if the wind speed at the lower airship slightly exceeded the wind speed at the upper airship. The effect becomes more pronounced when the altitude separation of the airships is reduced, since this implies greater operating tension on the tether. Of course, the upper airship could have also been designed with larger parafoils and parachutes to allow for an even greater imbalance (although this implies a penalty in weight and cost).

d. The dotted lines labeled "PT", running generally diagonally from lower left to upper right, indicate qualitatively the outer boundaries of the operational conditions that can be satisfied with a combination of propulsive capability, parafoils, and parachutes (trim). If one overlays a joint probability distribution of dynamic pressure on this diagram, with the dynamic pressure measured at e.g. 18 km and 37 km, for a particular latitude and longitude, one will typically find that much of the probability mass lies within the dotted region—but not all.

e. The regions outside the dotted domain are labeled "Change Δ Altitude", and refer to the pairwise conditions of dynamic pressure (at the lower and upper airship) where stationkeeping cannot be maintained using the forces available from propulsion, parafoil and parachute. In these regions, the system must change its altitude separation in order to find conditions suitable for stationkeeping. As noted earlier with reference to FIG. 11, it is generally possible to find a suitable altitude separation if the wind profile as a function of altitude is known (or can be explored).

f. While the regions outside the dotted lines represent regions where stationkeeping cannot be performed without a change in altitude separation (and, in very rare instances, not even then), an operational system could choose to adjust the altitude separation between the airships when the system is within the dotted lines, or even within the shaded regions labeled "Trim". This or other operations, such as disposing of ballast, venting gas, etc, can all be performed as desired within a particular mission.

Figure 13A:
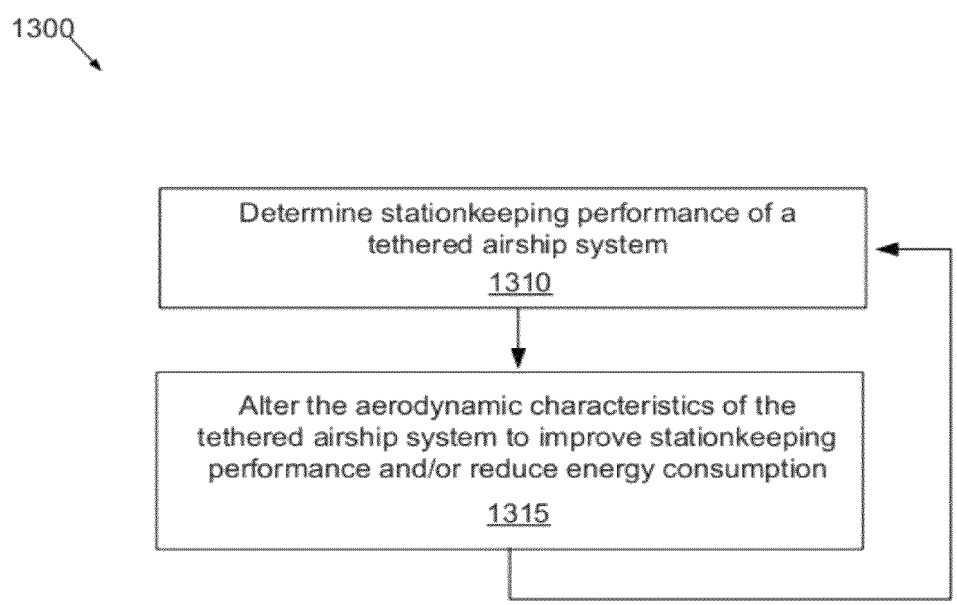
FIGS. 13A and 13B illustrates methods for maintaining stationkeeping with a tethered airship system, according to one example of the principles described herein.

Now consider a tethered airship system, in accordance with the present invention, operating in conditions that allow complete drag cancellation without propulsive force (i.e., relying solely on parafoils and parachutes). When the pairwise dynamic pressure at the lower and upper airships is plotted on a diagram such as FIG. 12 (but tailored to the specific design and flight altitudes), it will be in one of the regions labeled "Trim". Within these trim regions, the illustrative method shown in FIG. 13A can be used to control stationkeeping. The stationkeeping performance of the tethered airship system is evaluated on a continuous or periodic basis (step 1310). As discussed above, the aerodynamic characteristics of the tethered airship system can be altered to improve the stationkeeping performance (step 1320). This process is repeated for as long as it is deemed effective and efficient. As used in the specification and appended claims, the phrase "improve stationkeeping performance" refers to a reduction in the amount of energy required to maintain the geospatial position of the airship system within a predetermined range. In some cases the improvement in stationkeeping performance may be such that no propulsion energy output is required to maintain the geospatial position.

However as the winds change, the position of the system, as represented within this diagram (FIG. 12), will change as well. At some point, inevitably, the system will find itself outside the "Trim" regions and perhaps even outside the dotted domain—hence unable to perform stationkeeping. At this point, the system must determine if a change in altitude separation can be performed such that stationkeeping capability can be restored. If the system or its controlling elements (e.g., on the ground) have complete knowledge of all weather conditions in the altitude ranges that can be reached or explored by the airships, a desired new altitude separation can be found, and the lower airship can be commanded to adjust the length of the tether so that this new altitude separation is achieved. In rare instances, it may be necessary (or desirable, even if not strictly necessary) to allow the airships to drift off-station for a period of time, until wind conditions change.

In general, some knowledge of weather conditions is assumed to exist. This may be precise real-time knowledge of the winds over the entire altitude range that can be reached by the airships, or probabilistic estimates based on historical data, or a combination of the two (e.g, if the tether is instrumented with sensors, the current weather conditions below the upper airship might be known precisely, while the current weather conditions above the upper airship might be known only probabilistically). Some predictive estimates into the future may also be available. Also in general, a choice is always available between seeking to resolve the stationkeeping problem immediately, or doing nothing. Doing nothing might be warranted, for example, if the drift rate is very low and small position offsets are not operationally significant (especially if resolution of the stationkeeping problem is expected to require a very large energy expenditure), or if weather conditions are expected to change for the better in the near future.

If perfect knowledge is available, and the airships are separated by a vertical separation $\Delta Alt_{current}$ where $\Delta Alt_{current}$ is between $\Delta Alt_{min}$ and $\Delta Alt_{max}$ inclusive, there will zero, one or more separations $\Delta Alt > \Delta Alt_{current}$ where stationkeeping can be achieved; similarly, there will be zero, one or more separations $\Delta Alt < \Delta Alt_{current}$ where stationkeeping can be achieved. If there are no solutions $\Delta Alt < \Delta Alt_{current}$, and one or more solutions $\Delta Alt > \Delta Alt_{current}$, the only "pro-active solution" is to go up (i.e., increase the altitude separation) to the first suitable separation. Conversely, if the situation is reversed, the only "pro-active solution" is to go down (i.e., decrease the altitude separation) to the first suitable separation. There is both a time cost and an energy cost to any pro-active solution—it takes time to make any change in ΔAlt, and it takes an energy expenditure to decrease ΔAlt (note: there is no significant energy cost to increase ΔAlt, and in some embodiments the immediate "cost" may be negative since energy can be recovered and stored in the batteries. However, there is at least an opportunity cost because any subsequent decrease in ΔAlt, of the same magnitude, involves a greater expenditure of energy than can be recovered by the initial increase). A cost function involving one or more of the parameters of time expenditure, immediate energy cost, and future energy cost (i.e., an opportunity cost assessed against increases in ΔAlt) can be assessed against the available solutions (if any) at both increased and decreased ΔAlt. The cost function calculates a metric in arbitrary units of utility that allow a comparison of, and selection between, alternative solutions. The cost function can optionally be sensitive to the expected probability of success (e.g., assessing a variable opportunity cost of future energy expenditures based on the probability that the candidate solution fails to satisfy requirements), and can also optionally be sensitive to expected future conditions (e.g. catering to the fact that energy reserves can be restored if the solution is expected to be useful for a long period of time). Similarly, a cost of doing nothing can also be assessed, considering one or more of the parameters of current position offset, drift rate, and expected penalty of additional delay (which may be related to drift rate as well as other parameters). With these utility metrics available for each candidate solution (including the solution of doing nothing), a choice can be made.

For example, if any non-zero drift rate is assigned very high cost (i.e., failure of stationkeeping is considered highly undesirable), then the best choice will be to proceed immediately to the new ΔAlt that can be reached with the smallest loss of utility, and that allows stationkeeping to be achieved. Alternatively, if small position offsets and drift rates are assigned relatively low cost, the decision process might lead to a delay in action (less of a hair trigger). The cost functions will have an effect on mission performance as well as system design (i.e., since energy storage systems on the lower airship on how effective the system is at managing drag, and also the energy cost of that management, and the tether and tether deployment mechanism might suffer more wear and tear if the system is on a hair trigger). Therefore, the cost functions should be optimized through simulation as part of the overall system design process.

If perfect knowledge is not available (i.e., some weather information is only probabilistic), the decision-making process is more complex because some potential solutions might be "false" and lead to a need for further change. Consider the case where a known solution exists with absolute confidence at $\Delta Alt < \Delta Alt_{current}$, requiring significant expenditure of time and energy to achieve, and a suspected solution exists at $\Delta Alt > \Delta Alt_{current}$, requiring limited time and no energy expenditure to achieve. However, if the suspected solution is pursued, and turns out to be false, even greater time and energy will be needed to achieve the known solution. In this situation, a risk-averse strategy would select the known solution. Conversely, a Bayesian strategy would select one or the other depending on the expected probability of success for the suspected solution, in order to minimize the expected cost. The Bayesian strategy leads to lowest average cost; however, it will lead to increased costs in individual cases. The Bayesian approach can be extended to multiple possible solutions, and can handle the case where all solutions are uncertain. Both discretized formulations of the general cost minimization problem (e.g., for the present invention, assigning possible solutions for each 500 m value of $\Delta Alt$), and continuous formulations can be used to solve the problem.

Figure 13B:
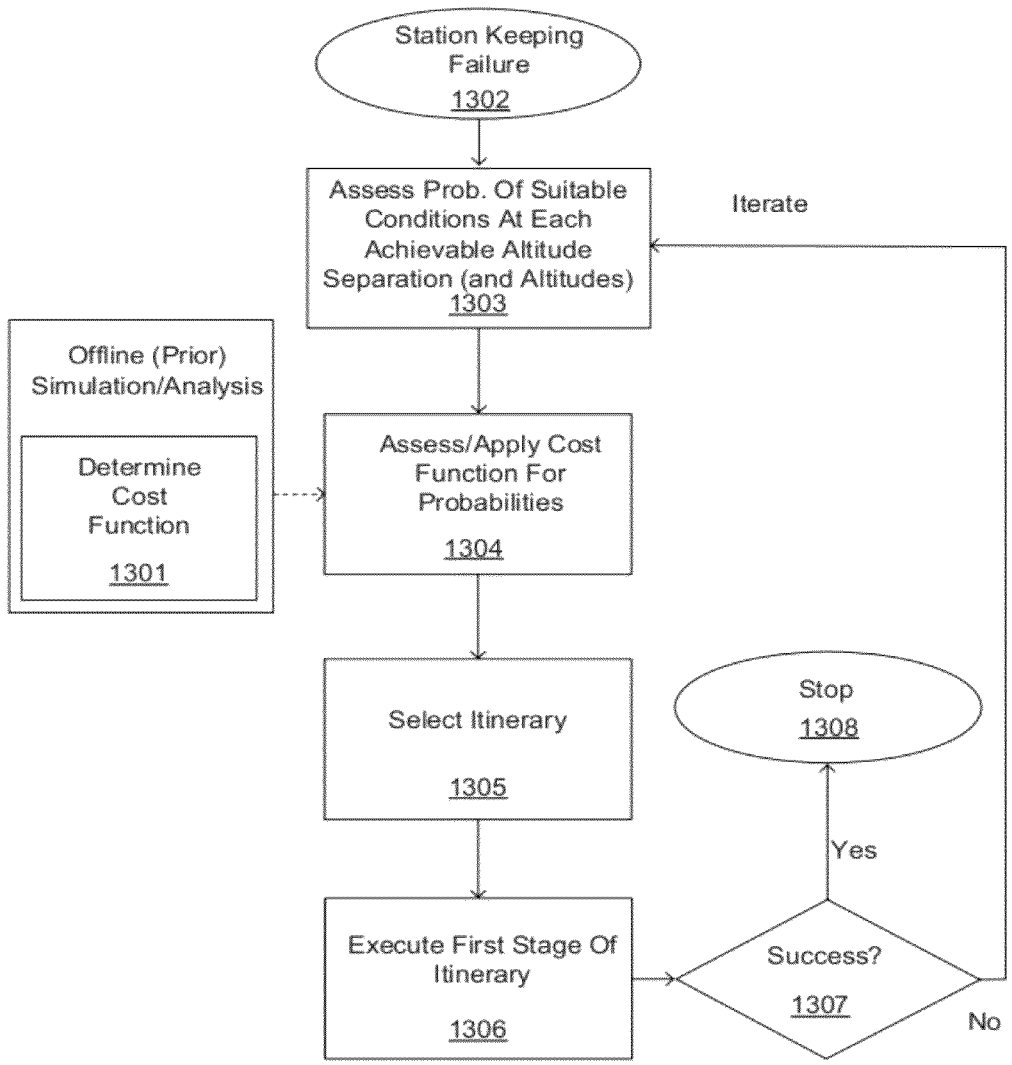

FIG. 13B illustrates one illustrative decision process that can be used for stationkeeping of a tethered airship system. In step 1301, as part of the design process, different decision strategies and cost functions are assessed in the projected environment, in conjunction with proposed designs. The decision strategies, cost functions and overall system design are finalized jointly to ensure reliable operation of the system over time. Subsequently, during the operation of the system, there will come a time (on multiple occasions) when stationkeeping is not achievable at the then-current $\Delta Alt$. This is indicated by step 1302. It is noted that the "failure" could be a transition out of the "Trim" region of FIG. 12, or the transition out of the "PT" region, or even a more general event (e.g., an anticipated failure, or a dangerous increase in wind speed that the system seeks to avoid). At this point, in step 1303, the probability of finding suitable conditions for stationkeeping is assessed at all achievable altitude separations using a discretized model at increments of $\Delta Alt_{inc}$ meters (e.g., 500 m). These probabilities may be certain (100% probability of success) or uncertain, and may include simple assessments of stationkeeping viability or additional considerations such as excessive wind speed limits. For example, the probability of favorable wind conditions can be assess at each of a plurality of deployed tether lengths between the first airship and the second airship or at altitudes attainable by the airship system.

At step 1304, the cost functions previously developed are applied to the candidate solutions. For example, if the system is currently operating at $\Delta Alt=10$ km and $\Delta Alt_{max}=18$ km, and if $\Delta Alt_{inc}$ is 500 m, there will be 16 candidate solutions above $\Delta Alt$ (one every 500 m), and every one of these candidate solutions will have a probability of success (ranging from 0 to 1 inclusive), and an associated cost. Step 1304 also calculates the cost of doing nothing. For example, the cost function may assess the cost for achieving each deployed tether length, including the amount of energy which would be required to take up/let out the desired portion of the tether.

In step 1305, an itinerary is selected. For this example, the itinerary is simply to either go "up" (increase $\Delta Alt$) or to go "down" (decrease $\Delta Alt$), or do nothing. Several alternatives exist for the decision criterion:

a. Accumulated probability of success. In this alternative, cost metrics are ignored and the probability of success is evaluated for all candidates in the "up" direction versus the "down" direction. The "up" or "down" itinerary with the greatest probability of success is selected. Note that the "do nothing" itinerary is not available for this option since its probability of success is zero. Also, these metrics are formed with the assumption that, once selected, the system will execute an itinerary until it reaches an endpoint, and only then would it (possibly) reverse direction. However, this decision can be revisited later (see below).

b. Maximum utility. In this alternative, the utility (benefits and costs) of each itinerary are assessed. All three itineraries are possible candidates, and the complete "up" and "down" itineraries are assessed on probabilistic grounds considering the likelihood of success and failure at each increment of $\Delta Alt$. The itinerary with the greatest utility is selected.

Other selection criteria are feasible and within the scope of the present invention.

In step 1306, the first stage of the selected itinerary is executed ($\Delta Alt$ is changed by $\Delta Alt_{inc}$).

In step 1307, the system determines if stationkeeping (or more general criteria such as e.g. limitation on excessive winds) is satisfied and/or improved. If so, the system stops changing Alt and proceeds to optimize its operation at the new $\Delta Alt$. Conversely, if success is not achieved, the system returns to step 1303 and iterates through the process. Note that this early iteration occurs after only the first (and each subsequent) incremental change in $\Delta Alt$. Therefore, in some scenarios the system may initiate an "upward" itinerary and then reverse to a "downward" itinerary, or initiate a "downward" itinerary and then reverse to an "upward" itinerary. It is also possible that the system would initiate an upward or downward itinerary, and then choose to "do nothing" after a first step, even if the stationkeeping failure (or more generalized criterion) was not formally satisfied.

In the event that the selected itinerary is to "do nothing", the test for success in step 1307 will immediately result in a "no." In this case, a suitable timer can be implemented to trigger the iterative procedure at a reasonable future time (e.g., 10 minutes, or one hour, in the future).

Other Embodiments

Other embodiments of the present systems and methods include, but are not limited to, the following features that may occur individually or in combination:

a) The embodiment described above in the sizing exercise where the upper airship additionally includes a propulsion system;

b) The embodiment described above in the sizing exercise, where the upper airship additionally includes a solar power generation system and/or a wind power generation system;

c) The embodiment substantially as described above in the sizing exercise, with the addition of a power transfer system between the two airships allowing the upper airship to derive its power from the lower airship, instead of a solar (or wind) power system on the upper airship, allowing the solar (or wind) power system on the upper airship to be deleted;

d) The embodiment substantially as described above in the sizing exercise, additionally comprising an electric power generation subsystem based on current flow between the upper and lower airship induced by the ambient voltage gradient, thereby allowing the solar (or wind) power subsystems on one or both of the airships to be reduced in size or eliminated;

e) The tether also adapted to serve as one or several antennas for radio communications (e.g., via conductive portions of the tether tailored to specific antenna designs);

f) The tether adapted to include, spaced along its length, atmospheric sensors to enhance the real-time knowledge of ambient conditions (e.g., temperature, pressure, wind). These atmospheric sensors could be used to collect a variety of information including information that could be useful for weather prediction in general and also for control and stabilization of the tethered airships.

g) Round and dirigible-shaped airships (as well as other shapes not illustrated here) are, to a degree, interchangeable in the various embodiments of the invention. Detailed designs of the various configurations will depend on the selected shapes of the airships.

The present invention offers a system and method for long-duration stratospheric operations without refueling, and with relatively small (i.e., low total weight) systems compared to currently-known techniques. By substantially reducing overall system weight, as well as the weight of key subsystems such as propulsion and energy generation and storage, total cost is reduced. Furthermore, by providing for indefinite operations in the stratosphere without returning large and fragile airships to the ground for refueling and refurbishment, overall risk to the system is reduced. Additionally, in comparison to a system of multiple airships each with a payload that are cycled through a mission area in order to maintain continuous operations, the present invention achieves continuous operations with a single tethered airship system, thereby avoiding the cost of multiple airships and multiple payloads.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A tethered airship system comprising a first airship operating at a first altitude, a second airship operating at a second altitude, and a tether, wherein:
    the first airship is configured to be equilibrially buoyant, while carrying the tether, in a first altitude range;
    the second airship is configured to be equilibrially buoyant in a second altitude range, the first altitude range being higher than the second altitude range;
    the tether connecting the first airship to the second airship such that the first airship is at least one kilometer above the second airship;
    said tethered airship system further comprising an aerodynamic element for modulating the drag provided by said aerodynamic element, to either the first or second airship, at a particular wind speed.

2. The system of claim 1, in which the first altitude range is between 20 and 50 kilometers above sea level and the second altitude range is between 10 and 30 kilometers above sea level.

3. The system of claim 1, in which the first airship in the first altitude range is subject to winds blowing in a first direction and the second airship in the second altitude range is subject to winds blowing in a second direction, such that the drag force produced by the first airship and the drag force produced by the second airship are in substantially opposing directions.

4. The system of claim 1, in which the tether mechanically transmits drag forces and lift forces between the airships.

5. The system of claim 1, wherein the aerodynamic element comprises a drogue chute configurable to adjust the aerodynamic drag of at least one of the first airship or the second airship.

6. The system of claim 1, further comprising at least one parafoil attached to at least one of the first airship or the second airship.

7. The system of claim 6, in which at least one parafoil is controllable to induce vertical forces, drag forces parallel to a wind vector, and lateral forces perpendicular to the wind vector.

8. The system of claim 6, in which a parafoil attached to the first airship comprises at least one envelope containing lighter than air gas.

9. The system of claim 6, in which a parafoil attached to the second airship comprises at least one envelope containing heavier than air gas.

10. The system of claim 6, in which at least one parafoil comprises ram filled chambers.

11. The system of claim 1, in which the first airship comprises two pressurized envelopes connected to a truss.

12. The system of claim 11 in which the truss is a cruciform truss having a main truss and a crossbar, in which a parafoil is attached to a crossbar of the cruciform truss.

13. The system of claim 11, further comprising a crossbar attached to the truss by cables and partially or completely suspended above the truss by buoyant or dynamic lift generated by a parafoil.

14. The system of claim 1, further comprising an energy generating system for producing electrical power in the second airship.

15. The system of claim 14, in which the electrical power generated in the second airship is transmitted to the first airship via the tether.

16. The system of claim 15, in which the electrical power is generated by one of: a wind power generator, a solar power generator, or an electrostatic power generator.

17. The system of claim 16, in which the wind electrical generator comprises a propeller which is also adapted to propel the airship.

18. The system of claim 1, further comprising a tether mount attached to the second airship comprising at least one of a movable axle, and a take up reel.

19. The system of claim 18, in which the tether mount is connected to the second airship such that an attachment angle between the tether mount and a gas envelope of the second airship can be changed.

20. The system of claim 1, wherein the system is configured to:
    evaluate the stationkeeping performance of the tethered airship system by determining aerodynamic forces acting on the first airship at the first altitude; and
    alter an aerodynamic configuration of the tethered airship system to improve the stationkeeping performance of the tethered airship system by altering the aerodynamic characteristics of the second airship at the second altitude to compensate for aerodynamic forces acting on the first airship.

21. The system of claim 20, in which the first altitude and second altitude are stratospheric altitudes that are vertically separated by at least five kilometers and in which winds at the first altitude and winds at the second altitude are traveling in substantially opposite directions.

22. The system of claim 20, in which altering the aerodynamic characteristics of the tethered airship system comprise at least one of: altering the heading of one of the airships, deploying a drogue chute, altering aerodynamic characteristics of the drogue chute, deploying a parafoil, altering the aerodynamic characteristics of the parafoil, and changing at least one of the first altitude and the second altitude.

23. The system of claim 20, in which the system is further configured to:
assess a probability of favorable wind conditions at each of a plurality of achievable altitude pairs for the first airship and the second airship;
assess the cost for achieving each altitude pair;
select an itinerary of potential altitude pairs;
execute the itinerary by changing a deployed length of the tether connecting the first airship to the second airship; and
evaluate improvement of the stationkeeping.

24. The system of claim 20, in which the system is further configured to:
assess a probability of favorable wind conditions at each of a plurality of deployed tether lengths between the first airship and the second airship;
assess the cost for achieving each deployed tether length;
select an itinerary of deployed tether lengths;
execute the itinerary; and
evaluate improvement of the stationkeeping.

25. A method for stationkeeping of a tethered airship system comprising a first airship, a second airship and a tether, wherein the first airship is configured to be equilibrially buoyant, while carrying the tether, in a first altitude range; the second airship is configured to be equilibrially buoyant in a second altitude range, the first altitude range being higher than the second altitude range; the tether connecting the first airship to the second airship such that the first airship is operated at a first altitude that is at least one kilometer above the second airship operated at a second altitude, the method comprising:
evaluating stationkeeping performance of the tethered airship system relative to a fixed latitude and longitude; and
altering the aerodynamic characteristics of the tethered airship system to reduce propulsion requirements while maintaining position close to the fixed latitude and longitude.

26. The method of claim 25, further comprising:
determining aerodynamic forces acting on the first airship at the first altitude; and
altering the aerodynamic characteristics of the second airship at the second altitude to compensate for aerodynamic forces acting on the first airship.

27. The method of claim 25, in which the first altitude and second altitude are stratospheric altitudes that are vertically separated by at least five kilometers.

28. The method of claim 25, in which the first altitude and second altitude are selected such that winds at the first altitude and winds at the second altitude are traveling in substantially opposite directions.

29. The method of claim 25, in which altering the aerodynamic characteristics of the tethered airship system comprises: altering the heading of one of the airships, deploying a drogue chute, altering aerodynamic characteristics of the drogue chute, deploying a parafoil, altering the aerodynamic characteristics of the parafoil, or changing at least one of the first altitude and the second altitude.

30. The method of claim 25, further comprising:
assessing a probability of favorable wind conditions at each of a plurality of achievable altitude pairs for the first airship and the second airship;
assessing a cost for achieving each altitude pair;
selecting an itinerary of potential altitude pairs;
executing the itinerary; and
evaluating improvement of the stationkeeping performance.

* * * * *